United States Patent
Kawasaki et al.

(10) Patent No.: US 6,801,392 B2
(45) Date of Patent: Oct. 5, 2004

(54) SOFT MAGNETIC FILM HAVING HIGH SATURATION MAGNETIC FLUX DENSITY, THIN FILM MAGNETIC HEAD USING THE SAME, AND METHODS OF PRODUCING THE SOFT MAGNETIC FILM AND THE THIN FILM MAGNETIC HEAD

(75) Inventors: Mitsuo Kawasaki, Niigata-ken (JP); Yoshihiro Kanada, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 200 days.

(21) Appl. No.: 10/041,377

(22) Filed: Jan. 8, 2002

(65) Prior Publication Data

US 2002/0154443 A1 Oct. 24, 2002

(30) Foreign Application Priority Data

Jan. 9, 2001 (JP) .......................................... 2001-001471
Jan. 9, 2001 (JP) .......................................... 2001-001458

(51) Int. Cl.[7] .............................................. G11B 5/127
(52) U.S. Cl. ........................ 360/126; 360/125; 360/119
(58) Field of Search ................................. 360/125, 126, 360/119, 317

(56) References Cited

U.S. PATENT DOCUMENTS

| | | | |
|---|---|---|---|
| 4,429,337 A | * | 1/1984 | de Wilde .................... 360/123 |
| 4,589,042 A | | 5/1986 | Anderson et al. |
| 5,606,478 A | | 2/1997 | Chen et al. |
| 5,812,350 A | | 9/1998 | Chen et al. |
| 5,864,450 A | | 1/1999 | Chen et al. |
| 5,879,798 A | * | 3/1999 | Kobayashi et al. .......... 428/332 |
| 6,104,574 A | * | 8/2000 | Takano et al. ............... 360/126 |
| 6,118,628 A | | 9/2000 | Sano et al. |
| 6,396,660 B1 | * | 5/2002 | Jensen et al. ................ 360/126 |
| 6,449,122 B1 | * | 9/2002 | Yazawa et al. .............. 360/126 |
| 6,538,845 B1 | * | 3/2003 | Watanabe et al. ........... 360/126 |
| 2002/0008936 A1 | * | 1/2002 | Kawasaki et al. ........... 360/126 |
| 2002/131205 A1 | * | 9/2002 | Gotoh et al. ................. 360/126 |
| 2002/0154443 A1 | * | 10/2002 | Kawasaki et al. ........... 360/126 |
| 2002/0163759 A1 | * | 11/2002 | Kanada et al. .............. 360/126 |
| 2003/0085131 A1 | * | 5/2003 | Li et al. ...................... 205/259 |
| 2003/0147176 A1 | * | 8/2003 | Gotoh et al. ................. 360/126 |

* cited by examiner

Primary Examiner—William Klimowicz
(74) Attorney, Agent, or Firm—Brinks Hofer Gilson & Lione

(57) ABSTRACT

A lower pole layer and/or an upper pole layer is formed by plating a NiFe alloy having a Fe composition ratio of 76% by mass to 90% by mass, or having an average crystal grain diameter of 130 Å to 175 Å and a Fe composition ratio of 70% by mass to 90% by mass. As a result, the saturation magnetic flux density can be increased to 1.9 T or more, and a thin film magnetic head excellent for a higher recording density can be manufactured.

23 Claims, 9 Drawing Sheets

SOFT MAGNETIC FILM HAVING HIGH SATURATION MAGNETIC FLUX DENSITY, THIN FILM MAGNETIC HEAD USING THE SAME, AND METHODS OF PRODUCING THE SOFT MAGNETIC FILM AND THE THIN FILM MAGNETIC HEAD

BACKGROUND OF THE INVENTION

1. Field of the Invention

The present invention relates to a magnetic film permitting an increase in the saturation magnetic flux density Bs of a NiFe alloy used as, for example, a core material of a thin film magnetic head, as compared with a conventional value, and having excellent other soft magnetic properties and film properties, and a method of producing the magnetic film. The present invention also relates to a thin film magnetic head using the magnetic film, and a method of manufacturing the thin film magnetic head.

2. Description of the Related Art

In a planar magnetic device such as a thin film magnetic head, a thin film inductor, or the like, a NiFe alloy (Permalloy) is frequently used for a portion made of magnetic a material.

The NiFe alloy has relatively excellent soft magnetic properties, and can easily be plated, and thus the NiFe alloy is one of magnetic materials frequently used.

The NiFe alloy is conventionally plated by electroplating with a DC current. The Fe composition ratio is generally about 45% by mass to 55% by mass. The NiFe alloy having this composition has a saturation magnetic flux density Bs of about 1.5 T (Tesla).

However, in order to improve a recording density in future, it is demanded to further increase the saturation magnetic flux density Bs of the NiFe alloy.

Therefore, the inventors used an electroplating method using a pulsed current in place of a conventional electroplating method using a DC current. As a result, the inventors could increase the Fe composition ratio X of the NiFe alloy as compared with a conventional alloy, and succeeded in increasing the saturation magnetic flux density mainly depending upon the Fe composition ratio X. Specifically, the inventors succeeded in greatly increasing the saturation magnetic flux density Bs to about 1.9 T. A NiFe alloy film formed by an electroplating method using a pulsed current, and a method of producing the same have already been applied for a patent as U.S. patent application Ser. No. 09/599,349.

According to U.S. patent application Ser. No. 09/599,349, a soft magnetic film of an NiFe alloy having a Fe composition ratio X of 60% by mass to 75% by mass, and an average crystal grain diameter of 105 Å or less can be produced by an electroplating method using a pulsed current.

However, the soft magnetic film has the problem in which the saturation magnetic flux density Bs cannot be increased to 1.9 T or more.

The plating bath composition used for producing the soft magnetic film has a Ni ion concentration of about 40 g/l. Although the Fe composition ratio of the NiFe alloy can be possibly increased by increasing the Fe ion concentration of the plating bath, it was found by actual experiment that the Fe composition ratio cannot be increased to 75% by mass or more. Even if the Fe composition ratio can be increased to 75% by mass or more, crystallinity deteriorates to fail to form a dense crystal, thereby failing to improve the saturation magnetic flux density Bs and deteriorating other film properties such as coercive force, surface roughness, etc.

SUMMARY OF THE INVENTION

Accordingly, the present invention has been achieved for solving the above problem of conventional NiFe alloys, and an object of the present invention is to provide a soft magnetic film permitting an increase in the saturation magnetic flux density Bs of a NiFe alloy, and having excellent other soft magnetic properties and film properties.

Another object of the present invention is to provide a thin film magnetic head using a soft magnetic film having a high saturation magnetic flux density Bs of 1.9 T or more so that it can comply with increases in recording density and frequency in future.

A further object of the present invention is to provide a method of manufacturing a thin film magnetic head which is capable of increasing the Fe content in a NiFe alloy by appropriately controlling a plating bath composition, and forming a crystal having a larger crystal grain diameter and higher density than conventional NiFe alloys.

A soft magnetic film of the present invention has a composition represented by the formula $Ni_{1-x}Fe_x$ wherein the Fe composition ratio X is 76% by mass to 90% by mass.

In the present invention, the soft magnetic film preferably has an average crystal grain diameter of 150 Å to 175 Å.

In a NiFe alloy according to a first embodiment of the present invention, only the Fe composition ratio X is defined. The saturation magnetic flux density Bs mainly depends upon the Fe composition ratio X, and increases as the Fe composition ratio X increases. The possible reason for this is that crystallization is appropriately promoted by increasing the Fe composition ratio X to form a dense crystal. However, with the Fe composition ratio X of a certain value or more, crystallization is conversely inhibited to fail to form a dense crystal, possibly decreasing Bs.

A production method of the present invention described below is capable of setting the Fe content of the NiFe alloy to 76% by mass to 90% by mass by appropriately controlling the composition of a plating bath. Therefore, the saturation magnetic flux density Bs of the NiFe alloy can be increased to 1.95 T or more. Also, coercive force Hc can be suppressed to 553 (A/m) or less.

A soft magnetic film of the present invention has a composition represented by the formula $Ni_{1-x}Fe_x$ wherein the average crystal grain diameter is 130 Å to 175 Å, and the Fe composition ratio X is in the range of 70% by mass to 90% by mass.

In a NiFe alloy according to a second embodiment of the present invention, the Fe composition ratio and the average crystal grain diameter of the NiFe alloy are defined.

As described above, the saturation magnetic flux density Bs mainly depends upon the Fe composition ratio X, but a higher saturation magnetic flux density Bs can be stably obtained by further setting the average crystal grain diameter in an appropriate range.

In U.S. patent application Ser. No. 09/599,349, now U.S. Pat. No. 6,449,122, the Fe composition ratio X can be increased to 75% by mass which lies in the range of the Fe composition ratio X of the NiFe alloy according to the second embodiment of the present invention.

Although the range of the Fe composition ratio X of the present invention partially overlaps with that of U.S. patent application Ser. No. 09/599,349, now U.S. Pat. No. 6,449, 122, the present invention greatly differs from U.S. patent application Ser. No. 09/599,349, now U.S. Pat. No. 6,449, 122, in the crystal grain diameter. Namely, in the present invention, the crystal grain diameter is defined to 130 Å or more, while in U.S. patent application Ser. No. 09/599,349 (U.S. Pat. No. 6,449,122), the crystal grain diameter is defined to 105 Å or less.

In the present invention, crystallization is possibly appropriately promoted to increase the crystal grain diameter, forming a dense crystal, as compared with the NiFe alloy of U.S. patent application Ser. No. 09/599,349 (U.S. Pat. No. 6,449,122). As a result, in the present invention, the saturation magnetic flux density Bs of the NiFe alloy can be increased to 1.9 T or more, succeeding in effectively increasing the saturation magnetic flux density Bs.

In the present invention, coercive force can be suppressed to 553 (A/m) or less. The coercive force Hc possibly increases as the crystal grain diameter increases. However, in the present invention, the coercive force Hc little increases even when the crystal grain diameter increases, and the coercive force Hc of 553 (A/m) or less is a low value sufficiently used, for example, for a core material of a thin film magnetic head.

The possible reason why the coercive force Hc can be kept down even when the crystal grain diameter increases is that a crystal is densely grown. When the crystal is densely formed, the surface roughness of a film plane can be decreased, and in the present invention, the center line average roughness Ra of the film plane can be suppressed to 10 nm or less. In the present invention, the center line average roughness Ra is preferably 7 nm or less.

In the present invention, the Fe composition ratio X is preferably 72.5% by mass or more. This can increase the saturation magnetic flux density Bs of the NiFe alloy to 1.95 T or more.

Also, the average crystal grain diameter is preferably 150 Å or more. This can securely increase the saturation magnetic flux density Bs of the NiFe alloy to 1.95 T or more.

In the present invention, the Fe composition ratio X is preferably 78% by mass to 85% by mass. This can increase the saturation magnetic flux density Bs of the NiFe alloy to 2.0 T or more.

In the present invention, the soft magnetic film is preferably formed by plating. By forming the soft magnetic film by plating, the thickness can be relatively freely changed to form the soft magnetic thick film.

A method of producing a soft magnetic film of the present invention comprises plating a NiFe alloy by an electroplating method using a pulsed current, wherein the Ni ion concentration of a plating bath is 6.6 g/l to 20 g/l, and the ratio of the Fe ion concentration to the Ni ion concentration is 0.15 to 0.36.

As described above, in the present invention, the NiFe alloy is plated by the electroplating method using the pulsed current. In the electroplating method using the pulsed current, for example, a current control device is repeatedly turned on and off to provide a time to pass the current, and a blank time to pass no current. By providing the time to pass no current, the NiFe alloy film can be slowly formed by plating to reduce the deviation of the current density distribution at the time of plating, as compared with an electroplating method using a DC current. By the electroplating method using the pulsed current, the Fe content of the soft magnetic film can easily be controlled to increase the Fe content of the film, as compared with the electroplating method with the DC current.

In the present invention, the Ni ion concentration of the plating bath is set to 6.6 g/l to 20 g/l. In a conventional method, the Ni ion concentration is about 40 g/l, while in the present invention, the Ni ion concentration is lower than that value. As a result, the amount of Ni ions of the plating solution, which contact the surface of a cathode (the plated side) during deposition, can be decreased, thereby increasing the Fe content of the NiFe alloy due to the improved agitation effect.

As described above, in the present invention, the ratio of the Fe ion concentration to the Ni ion concentration is set to 0.15 to 0.36. Namely, in the present invention, not only the Ni ion concentration but also the Fe ion/Ni ion ratio is defined to increase crystallinity, permitting the formation of a dense crystal. In the present invention, the Ni ion concentration is decreased, and the concentration ratio is set to the above value, increasing the Fe content and the crystal grain diameter of the NiFe alloy. However, since the dense crystal can be formed, a high saturation magnetic flux density Bs can be stably obtained, and coercive force Hx can be decreased. Furthermore, surface roughness can be decreased, and membrane stress can also be decreased.

By using the above-described plating bath, the NiFe alloy film having a Fe composition ratio of 76% by mass to 90% by mass, or a Fe composition ratio of 70% by mass to 90% by mass, and an average crystal grain diameter of 130 Å to 175 Å can be produced with high reproducibility.

In the present invention, preferably, the Ni ion concentration is 10 g/l or more, and the Fe ion concentration/Ni ion concentration ratio is 0.2 to 0.35.

In the present invention, preferably, the Ni ion concentration is 10 g/l or less, and the Fe ion concentration/Ni ion concentration ratio is 0.15 to 0.36.

In the present invention, saccharin sodium is preferably mixed with the plating bath of the NiFe alloy. Saccharin sodium ($C_6H_4CONNaSO_2$) has the function as a stress relaxant, and the membrane stress of the NiFe alloy can be decreased by mixing saccharin sodium.

In the present invention, 2-butine-1,4-diol is preferably mixed with the plating bath. This can suppress coarsening of the crystal grains of the NiFe alloy plated to decrease the crystal grain diameter, thereby causing less voids between the crystal grains and suppressing surface roughness of the film plane. By suppressing surface roughness, the coercive force Hc can be decreased.

In the present invention, sodium 2-ethylhexyl sulfate is preferably mixed with the plating bath. Therefore, hydrogen produced in the plating bath is removed by sodium 2-ethylhexyl sulfate serving as a surfactant to prevent adhesion of hydrogen to the plated film, suppressing surface roughness.

Although sodium lauryl sulfate may be used in place of sodium 2-ethylhexyl sulfate, sodium 2-ethylhexyl sulfate produces less bubbles in mixing with the plating bath, and thus a large amount of sodium 2-ethylhexyl sulfate can be mixed with the plating bath, permitting the appropriate removal of hydrogen. By adding sodium 2-ethylhexyl sulfate, the membrane stress of the NiFe alloy can also be decreased.

A thin film magnetic head of the present invention comprises a lower core layer made of a magnetic material, an upper core layer formed on the lower core layer with a magnetic gap provided therebetween, and a coil layer for supplying a recording magnetic field to both core layers, wherein at least one of the core layers comprises a soft magnetic film represented by the composition formula $Ni_{1-X}Fe_X$, and having a Fe composition ratio X of 76% by mass to 90% by mass.

In the present invention, the thin film magnetic head preferably further comprises a lower pole layer formed to protrude above the lower core layer at a surface facing a recording medium, wherein the lower pole layer comprises the soft magnetic film.

A thin film magnetic head of the present invention comprises a lower core layer, an upper core layer, and a pole portion located between the lower core layer and the upper core layer and having a width dimension in the track width direction, which is defined to be shorter than the lower core layer and the upper core layer, wherein the pole portion comprises a lower pole layer continued from the lower core layer, an upper pole layer continued from the upper core layer, and a gap layer positioned between the lower pole layer and the upper pole layer, or an upper pole layer continued from the upper core layer and a gap layer positioned between the upper pole layer and the lower core layer, and wherein the upper pole layer and/or the lower pole layer comprises a soft magnetic film represented by the composition formula $Ni_{1-X}Fe_X$, and having a Fe composition ratio X of 76% by mass to 90% by mass.

In the present invention, preferably, the upper pole layer comprises the soft magnetic film, and the upper core layer formed on the upper pole layer comprises a soft magnetic film having a lower saturation magnetic flux density Bs than the upper pole layer.

In the present invention, preferably, each of the core layers comprises at least a portion in contact with the magnetic gap, which comprises at least two magnetic layers, or each of the pole layers comprises at least two magnetic layers, the magnetic layer in contact with the magnetic gap comprising the soft magnetic film.

In the present invention, the magnetic layer other than the magnetic layer in contact with the magnetic gap comprises a soft magnetic film having a lower saturation magnetic flux density Bs than the magnetic layer in contact with the magnetic gap.

In the present invention, the soft magnetic film preferably has an average crystal grain diameter of 150 Å to 175 Å.

The soft magnetic film used for the core layers and the pole layers of the thin film magnetic head of the present invention is represented by the composition formula $Ni_{1-X}Fe_X$ wherein the Fe composition ratio X is 76% by mass to 90% by mass.

In the NiFe alloy according to the first embodiment of the present invention, only the Fe composition ratio X of the NiFe alloy is defined. The saturation magnetic flux density Bs mainly depends upon the Fe composition ratio X, and increases as the Fe composition ratio X increases. The possible reason for this is that crystallization is appropriately promoted by increasing the Fe composition ratio X to densely form a crystal. However, with a Fe composition ratio of a certain value or more, crystallization is conversely inhibited to fail to form a dense crystal, thereby possibly decreasing the Bs.

In a production method of the present invention described below, the composition of a plating bath is appropriately controlled to set the Fe content of the NiFe alloy to 76% by mass to 90% by mass. This can increase the saturation magnetic flux density Bs of the NiFe alloy to 1.95 T or more. Also, coercive force Hc can be suppressed to 553 (A/m) or less.

By using the NiFe alloy for the core layers and the pole layers of the thin film magnetic head, a magnetic flux can be concentrated in the vicinity of the gap, thereby improving the recording density and permitting the manufacture of a thin film magnetic head adaptable to a higher recording density in future.

The NiFe alloy is formed within the above-described composition range, and thus the crystal can densely be formed, thereby suppressing surface roughness of the film plane and improving the corrosion resistance of the thin film magnetic head.

Instead of the above soft magnetic film, a soft magnetic film presented by the composition formula $Ni_{1-X}Fe_X$ may be used, in which the average crystal grain diameter is 130 Å to 175 Å, and the Fe composition ratio X is in the range of 70% by mass to 90% by mass.

In the NiFe alloy according to the second embodiment of the present invention, the Fe composition ratio and the average crystal grain diameter of the NiFe alloy are defined.

As described above, the saturation magnetic flux density Bs mainly depends upon the Fe composition ratio X, but a higher saturation magnetic flux density Bs can be stably obtained by further setting the average crystal grain diameter in an appropriate range.

In U.S. patent application Ser. No. 09/599,349 (U.S. Pat. No. 6,449,122), the Fe composition ratio X can be increased to 75% by mass which lies in the range of the Fe composition ratio X of the NiFe alloy according to the second embodiment of the present invention.

Although the range of the Fe composition ratio X of the present invention partially overlaps with that of U.S. Pat. No. 6,449,122, the present invention greatly differs from U.S. Pat. No. 6,449,122 in the crystal grain diameter. Namely, in the present invention, the crystal grain diameter is defined to 130 Å or more, while in U.S. Pat. No. 6,499,122, the crystal grain diameter is defined to 105 Å or less.

In the present invention, crystallization is possibly appropriately promoted to increase the crystal grain diameter, forming a dense crystal, as compared with the NiFe alloy of U.S. Pat. No. 6,499,122. As a result, in the present invention, the saturation magnetic flux density Bs of the NiFe alloy can be increased to 1.9 T or more, succeeding in effectively increasing the saturation magnetic flux density Bs.

In the present invention, coercive force can be suppressed to 553 (A/m) or less. The coercive force Hc possibly increases as the crystal grain diameter increases. However, in the present invention, the coercive force Hc little increases even when the crystal grain diameter increases, and the coercive force Hc of 553 (A/m) or less is a low value sufficiently used, for example, for a core material of a thin film magnetic head.

The possible reason why the coercive force Hc can be kept down even when the crystal grain diameter increases is that a crystal is densely grown. When the crystal is densely formed, the surface roughness of a film plane can be decreased, and in the present invention, the center line average roughness Ra of the film plane can be suppressed to 10 nm or less. In the present invention, the center line average roughness Ra is preferably 7 nm or less.

By using the NiFe alloy for the core layers and the pole layers of the thin film magnetic head, a magnetic flux can be concentrated in the vicinity of the gap, thereby improving the recording density and permitting the manufacture of a thin film magnetic head adaptable to a higher recording density in future.

The NiFe alloy is formed within the above-described composition range, and thus the crystal can densely be formed, thereby suppressing surface roughness of the film plane and improving the corrosion resistance of the thin film magnetic head.

In the present invention, the Fe composition ratio X is preferably 72.5% by mass or more. This can increase the saturation magnetic flux density Bs of the NiFe alloy to 1.95 T or more.

Also, the average crystal grain diameter is preferably 150 Å or more. This can securely increase the saturation magnetic flux density Bs of the NiFe alloy to 1.95 T or more.

In the present invention, the Fe composition ratio X is preferably 78% by mass to 85% by mass. This can increase the saturation magnetic flux density Bs of the NiFe alloy to 2.0 T or more.

In the present invention, the soft magnetic film is preferably formed by plating. By forming the soft magnetic film by plating, the thickness can be relatively freely changed to form the soft magnetic thick film.

A method of manufacturing a thin film magnetic head of the present invention, which comprises a lower core layer made of a magnetic material, an upper core layer opposed to the lower core layer with a magnetic gap provided therebetween at the surface facing a recording medium, and a coil layer for inducing a recording magnetic field in both core layers, comprises forming the upper core layer and/or the lower core layer by plating a NiFe alloy by an electroplating method using a pulsed current, wherein the Ni ion concentration of a plating bath is 6.6 g/l to 20 g/l, and the ratio of the Fe ion concentration to the Ni ion concentration is 0.15 to 0.36.

In the present invention, preferably, a lower pole layer is further formed to protrude above the lower core layer at a surface facing a recording medium, wherein the lower pole layer comprises the soft magnetic film.

A method of manufacturing a thin film magnetic head of the present invention, which comprises a lower core layer, an upper core layer, and a pole portion located between the lower core layer and the upper core layer and having a width dimension in the track width direction, which is defined to be shorter than the lower core layer and the upper core layer, comprises forming the upper pole layer and/or the lower pole layer by plating a NiFe alloy by an electroplating method using a pulsed current, wherein the pole portion comprises a lower pole layer continued from the lower core layer, an upper pole layer continued from the upper core layer, and a gap layer positioned between the lower pole layer and the upper pole layer, or an upper pole layer continued from the upper core layer and a gap layer positioned between the upper pole layer and the lower core layer, and the Ni ion concentration of a plating bath is 6.6 g/l to 20 g/l, and the ratio of the Fe ion concentration to the Ni ion concentration is 0.15 to 0.36.

In the present invention, preferably, the upper pole layer comprises the soft magnetic film formed by plating, and the upper core layer formed on the upper pole layer comprises a soft magnetic film having a lower saturation magnetic flux density Bs than the upper pole layer.

In the present invention, preferably, each of the core layers comprises at least a portion in contact with the magnetic gap, which comprises at least two magnetic layers, or each of the pole layers comprises at least two magnetic layers, the magnetic layer in contact with the magnetic gap comprising the soft magnetic film formed by plating.

In the present invention, the magnetic layer other than the magnetic layer in contact with the magnetic gap comprises a soft magnetic film having a lower saturation magnetic flux density Bs than the magnetic layer in contact with the magnetic gap.

As described above, in the present invention, the NiFe alloy is plated by the electroplating method using the pulsed current. In the electroplating method using the pulsed current, for example, a current control device is repeatedly turned on and off to provide a time to pass the current, and a blank time to pass no current. By providing the time to pass no current, the NiFe alloy film can be slowly formed by plating to reduce the deviation of the current density distribution at the time of plating, as compared with an electroplating method using a DC current. By the electroplating method using the pulsed current, the Fe content of the soft magnetic film can easily be controlled to increase the Fe content of the film, as compared with the electroplating method using the DC current.

In the present invention, the Ni ion concentration of the plating bath is set to 6.6 g/l to 20 g/l. In a conventional method, the Ni ion concentration is about 40 g/l, while in the present invention, the Ni ion concentration is lower than that value. As a result, the amount of Ni ions of the plating solution, which contact the surface of a cathode (the plated side) during deposition, can be decreased, thereby increasing the Fe content of the NiFe alloy due to the improved agitation effect.

As described above, in the present invention, the ratio of the Fe ion concentration to the Ni ion concentration is set to 0.15 to 0.36. Namely, in the present invention, not only the Ni ion concentration but also the Fe ion/Ni ion ratio is defined to increase crystallinity, permitting the formation of a dense crystal. In the present invention, the Ni ion concentration is decreased, and the concentration ratio is set to the above value, increasing the Fe content and the crystal grain diameter of the NiFe alloy. However, since the dense crystal can be formed, a high saturation magnetic flux density Bs can be stably obtained, and coercive force Hx can be decreased. Furthermore, surface roughness can be decreased, and membrane stress can also be decreased.

By using the above-described plating bath, the NiFe alloy film having a Fe composition ratio of 76% by mass to 90% by mass, or a Fe composition ratio of 70% by mass to 90% by mass, and an average crystal grain diameter of 130 Å to 175 Å can be produced with high reproducibility.

In the present invention, preferably, the Ni ion concentration is 10 g/l or more, and the Fe ion concentration/Ni ion concentration ratio is 0.2 to 0.35.

In the present invention, preferably, the Ni ion concentration is 10 g/l or less, and the Fe ion concentration/Ni ion concentration ratio is 0.15 to 0.36.

In the present invention, saccharin sodium is preferably mixed with the plating bath of the NiFe alloy. Saccharin sodium ($C_6H_4CONNaSO_2$) has the function as a stress relaxant, and the membrane stress of the NiFe alloy can be decreased by mixing saccharin sodium.

In the present invention, 2-butine-1,4-diol is preferably mixed with the plating bath. This can suppress coarsening of the crystal grains of the NiFe alloy plated to decrease the crystal grain diameter, thereby causing less voids between the crystal grains and suppressing surface roughness of the film plane. By suppressing surface roughness, the coercive force Hc can be decreased.

In the present invention, sodium 2-ethylhexyl sulfate is preferably mixed with the plating bath. Therefore, hydrogen produced in the plating bath is removed by sodium 2-ethylhexyl sulfate serving as a surfactant to prevent adhesion of hydrogen to the plated film, suppressing surface roughness.

Although sodium lauryl sulfate may be used instead of sodium 2-ethylhexyl sulfate, sodium 2-ethylhexyl sulfate produces less bubbles in mixing with the plating bath, and thus a large amount of sodium 2-ethylhexyl sulfate can be mixed with the plating bath, permitting the appropriate removal of hydrogen. By adding sodium 2-ethylhexyl sulfate, the membrane stress of the NiFe alloy can also be decreased.

DESCRIPTION OF THE PREFERRED EMBODIMENTS

Figure 1:
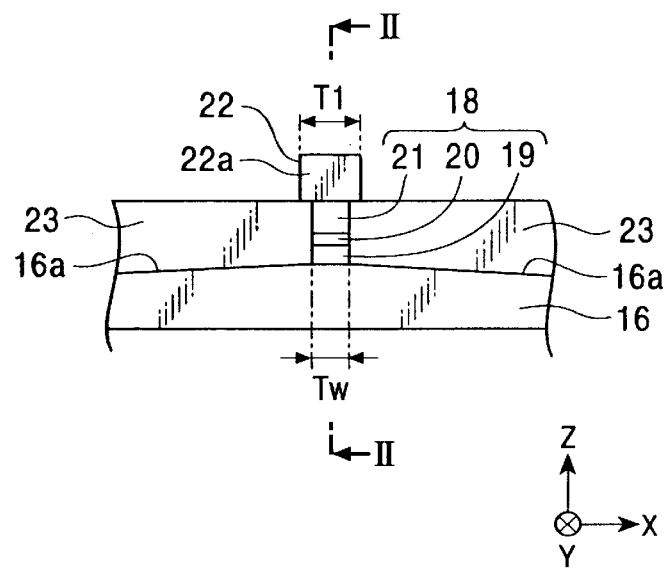
FIG. 1 is a partial front view of a thin film magnetic head according to a first embodiment of the present invention.
Figure 2:
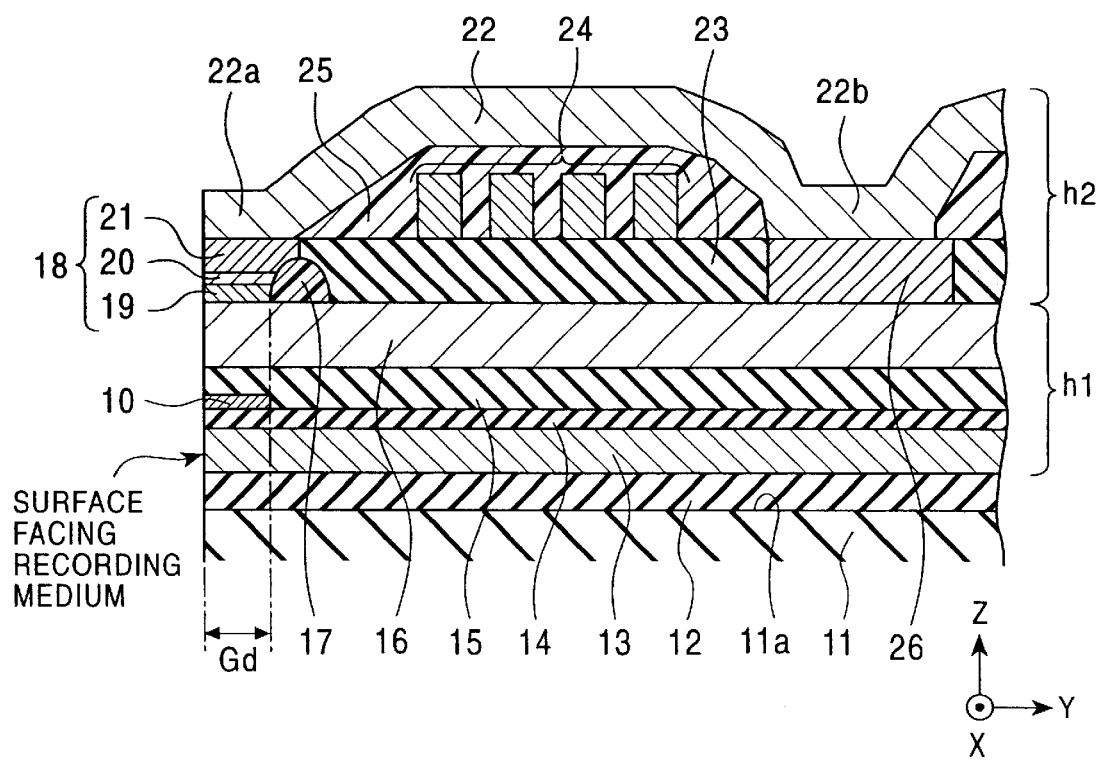
FIG. 2 is a longitudinal sectional view of the thin film magnetic head shown in FIG. 1.

FIG. 1 is a partial front view of a thin film magnetic head according to a first embodiment of the present invention, and FIG. 2 is a longitudinal sectional view of the thin film magnetic head taken along line II—II in FIG. 1, as viewed from the direction of arrows.

The thin film magnetic head of the present invention is formed on the trailing-side end surface 11a of a slider 11 of a ceramic material, which constitutes a floating head. The thin film magnetic head is an MR/inductive combination-type thin film magnetic head (referred to as a "thin film magnetic head" hereinafter) comprising a lamination of an MR head h1 and a writing inductive head h2.

The MR head h1 detects a leakage magnetic field from a recording medium such as a hard disk or the like by using a magnetoresistive effect to read a recording signal.

As shown in FIG. 2, a lower shield layer 13 made of a magnetic material such as NiFe or the like is formed on the trailing-side end surface 11a of the slider 11 through an $Al_2O_3$ film 12, and a lower gap layer 14 made of an insulating material is further formed on the lower shield layer 13.

Furthermore, a magnetoresistive element 10 such as an anisotropic magnetoresistive (AMR) element, a giant magnetoresistive (GMR) element, a tunneling magnetoresistive (TMR) element or the like is formed on the lower gap layer 14 so as to extend in the height direction (the Y direction shown in the drawing) from the surface facing the recording medium. Furthermore, an upper gap layer 15 made of an insulating material is formed on the magnetoresistive element 10 and the lower gap layer 14, and an upper shield layer 16 made of a magnetic material such as NiFe or the like is formed on the upper gap layer 15. The MR head hi comprises a laminated film ranging from the lower shield layer 13 to the upper shield layer 16.

In the embodiment shown in FIGS. 1 and 2, the upper shield layer 16 is also used as a lower core layer of the inductive head h2, and a Gd-determining layer 17 is formed on the lower core layer 16 so that the gap depth (Gd) is regulated by the length dimension from the surface facing the recording medium to the front edge of the Gd-determining layer 17. The Gd-determining layer 17 is made of, for example, an insulating material.

As shown in FIG. 1, the upper surface 16a of the lower core layer 16 is inclined in the downward direction so that it separates from the base end of a pole portion 18 in the track width direction (the X direction shown in the drawing), thereby suppressing the occurrence of side fringing.

As shown in FIG. 2, the pole portion 18 is formed to extend from the surface facing the recording medium to the top of the Gd-determining layer 17.

The pole portion 18 comprises a lower pole layer 19, a nonmagnetic gap layer 20 and an upper pole layer 21, which are laminated in turn from the bottom.

The lower pole layer 19 is formed by plating directly on the lower core layer 16. The gap layer 20 formed on the lower pole layer 19 is preferably made of a nonmagnetic metal material which can be plated. Specifically, at least one selected from NiP, NiPd, NiW, NiMo, Au, Pt, Rh, Pd, Ru, and Cr is preferably used.

In a specified embodiment of the present invention, NiP is used for the gap layer 20. By using NiP for forming the gap layer 20, the gap layer 20 can be appropriately put into a nonmagnetic state.

The upper pole layer 21 formed on the gap layer 20 is magnetically connected to an upper core layer 22 formed on the upper pole layer 21.

When the gap layer 20 is made of a nonmagnetic metal material which can be plated, the lower pole layer 19, the gap layer 20 and the upper pole layer 21 can be continuously formed by plating.

The pole portion 18 may comprise two layers including the gap layer 20 and the upper pole layer 21.

As shown in FIG. 1, the pole portion 18 is formed with a width dimension corresponding to the track width Tw in the track width direction (the X direction).

As shown in FIGS. 1 and 2, an insulating layer 23 is formed on both sides of the pole portion 18 in the track width direction (the X direction shown in the drawings) and in the portion behind the pole portion 18 in the height direction (the Y direction shown in the drawings). The upper surface of the insulating layer 23 is coplanar with the upper surface of the pole portion 18.

As shown in FIG. 2, a coil layer 24 is formed in a spiral pattern on the insulating layer 23. Also, an insulating layer 25 made of an organic insulating material is coated on the coil layer 24.

As shown in FIG. 2, the upper core layer 22 is patterned by, for example, a frame plating method to extend from the pole portion 18 to the insulating layer 25. As shown in FIG. 1, the front end 22a of the upper core layer 22 is formed with a width dimension T1 in the track width direction at the surface facing the recording medium, and the width dimension T1 is larger than the track width Tw.

As shown in FIG. 2, the base end 22b of the upper core layer 22 is connected directly to a connecting layer (back gap layer) 26 made of a magnetic material and formed on the lower core layer 16.

In the present invention, the upper pole layer 21 and/or the lower pole layer 19 comprises a soft magnetic film having a composition ratio below.

(1) The composition is represented by the formula $Ni_{1-x}Fe_x$ wherein the Fe composition ratio X is 76% by mass to 90% by mass.

The Fe composition ratio X of the present invention is higher than that of a NiFe alloy disclosed in U.S. Pat. No. 6,499,122.

The saturation magnetic flux density Bs mainly depends upon the Fe composition ratio X. Namely, the Bs increases as the Fe composition ratio X increases.

Therefore, by setting the Fe composition ratio X to 76% by mass or more, the saturation magnetic flux density Bs can be made higher than that of U.S. Pat. No. 6,499,122.

However, it was confirmed by the experiment described below that with a Fe composition ratio of over about 80% by mass, Bs gradually decreases. This is possibly due to the fact that with an excessively high Fe ratio, promotion of crystallization is inhibited to fail to form a dense crystal.

Therefore, in the present invention, according to the experimental results described below, the Fe composition ratio X is set to 76% by mass to 90% by mass. As a result, the saturation magnetic flux density Bs can be increased to 1.95 T or more.

A NiFe alloy having a Fe composition ratio X of 76% by mass to 90% by mass preferably has an average crystal grain diameter of 150 Å to 175 Å.

The experimental results below reveal that with an average crystal grain diameter of 150 Å or more, the saturation magnetic flux density can be securely increased to 1.95 T or more. It is also found that with an average crystal grain diameter of 175 Å or less, coercive force Hc can be decreased to 553 (A/m) or less.

In the present invention, the average crystal grain diameter is larger than that of U.S. Pat. No. 6,499,122, but crystallization is appropriately promoted to increase the crystal grain diameter and densely form a crystal. As a result, in the present invention, the saturation magnetic flux density Bs of the NiFe alloy can be increased to 1.9 T or more, succeeding in effectively increasing the saturation magnetic flux density Bs.

Although the crystal grain diameter is preferably as small as possible because coercive force Hc can be decreased, in the present invention, even when the crystal grain diameter is increased, a dense crystal can be formed. The experiment below reveals that even when the crystal grain diameter is increased to 175 Å, coercive force Hx can be decreased to 553 (A/m) or less.

With the NiFe alloy represented by the formula $Ni_{1-x}Fe_x$ having a Fe composition ratio X of 76% by mass to 90% by mass, the surface roughness of the film plane is decreased, and, in the present invention, the center line average roughness Ra of the film plane can be decreased to 10 nm or less. The average surface roughness Ra is preferably 7 nm or less.

The resistivity of the NiFe alloy can be set to 30 ($\mu\Omega\cdot$cm) to 50 ($\mu\Omega\cdot$cm).

In the present invention, the upper pole layer 21 and/or the lower pole layer 19 comprises a soft magnetic film having the composition ratio below.

(2) The composition is represented by the formula $Ni_{1-x}Fe_x$ wherein the Fe composition ratio X is in the range of 70% by mass to 90% by mass, and the average crystal grain diameter is 130 Å to 175 Å.

As described above, the saturation magnetic flux density Bs mainly depends upon the Fe composition ratio X. The Fe composition ratio X of the NiFe alloy partially overlaps with U.S. Pat. No. 6,499,122. However, in the overlap portion, the saturation magnetic flux density Bs can be made higher than that of U.S. Pat. No. 6,499,122. The reason for this is that in the present invention, a crystal having a large average crystal grain diameter is densely formed.

In the present invention, crystallization of the NiFe alloy is appropriately promoted to increase the average crystal grain diameter and form a dense crystal, thereby increasing the saturation magnetic flux density Bs to 1.9 T or more.

Since the dense crystal can be formed, even when the average crystal grain diameter is 130 Å to 175 Å, coercive force Hc can be suppressed to 553 (A/m) or less.

In the present invention, the crystal is densely formed to decrease the surface roughness of the film plane, and the center line average roughness Ra of the film plane can be suppressed to 10 nm or less. In the present invention, the center line average roughness Ra is preferably 7 nm or less.

Furthermore, the resistivity of the NiFe alloy can be set to 30 ($\mu\Omega\cdot$cm) to 50 ($\mu\Omega\cdot$cm).

In the NiFe alloy (2) of the present invention, the Fe composition ratio X is preferably 72.5% by mass or more. This can increase the saturation magnetic flux density to 1.95 T or more. Also, with the NiFe alloy having an average crystal grain diameter of 150 Å or more, the saturation magnetic flux density Bs can be securely increased to 1.95 T or more.

In the NiFe alloy (1) and/or (2) of the present invention, the Fe composition ratio X is preferably 78% by mass to 85% by mass. This can increase the saturation magnetic flux density Bs of the NiFe alloy to 2.0 T or more.

In the present invention, the membrane stress of the NiFe alloy is as small as possible. By decreasing the membrane stress, peeling or cracking of the upper pole layer 21 and the lower pole layer 19 can be appropriately prevented.

In the present invention, the membrane stress is preferably 400 MPa or less. It is confirmed by the experiment below that in order to securely obtain the membrane stress, the Fe composition ratio X is preferably 86% by mass or less.

As described above, in the present invention, with the NiFe alloy (1) having a Fe composition ratio X of 76% by mass to 90% by mass, the saturation magnetic flux density Bs can be increased to 1.95 T or more. By setting the average crystal grain diameter to 150 Å to 175 Å, Bs can be securely increased to 1.95 T or more, and coercive force Hc can be decreased to 553 (A/m) or less.

With the NiFe alloy (2) having an average crystal grain diameter of 130 Å to 175 Å, and a Fe composition ratio X of 70% by mss to 90% by mass, the saturation magnetic flux density Bs can be increased to 1.95 T or more, and coercive force Hc can be decreased to 553 (A/m) or less.

In the NiFe alloys (1) and (2) of the present invention, the crystal structure preferably comprises a mixed phase of a bcc structure (body-centered cubic structure) and a fcc structure (face-centered cubic structure), or a bcc structure.

By using the NiFe alloy film for the upper pole layer 21 and/or the lower pole layer 19, a magnetic flux can be concentrated in the vicinity of the gap to improve the recording density, and a thin film magnetic head adaptable to a higher recording density in future can be manufactured.

The NiFe alloy can be formed within the above composition range to densely form a crystal, thereby suppressing surface roughness of the film plane, and improving the corrosion resistance of a thin film magnetic head.

The NiFe alloy (1) or (2) can also be used for a thin film magnetic head according to another embodiment.

Figure 3:
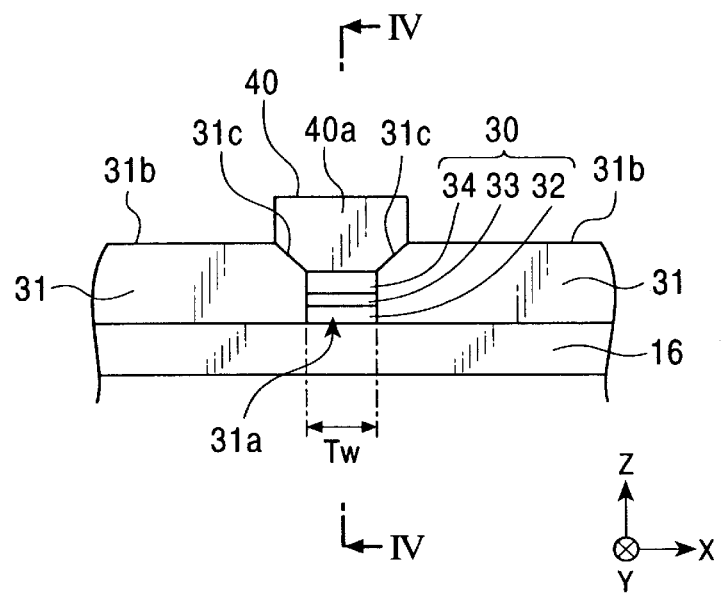
FIG. 3 is a partial front view of a thin film magnetic head according to a second embodiment of the present invention.
Figure 4:
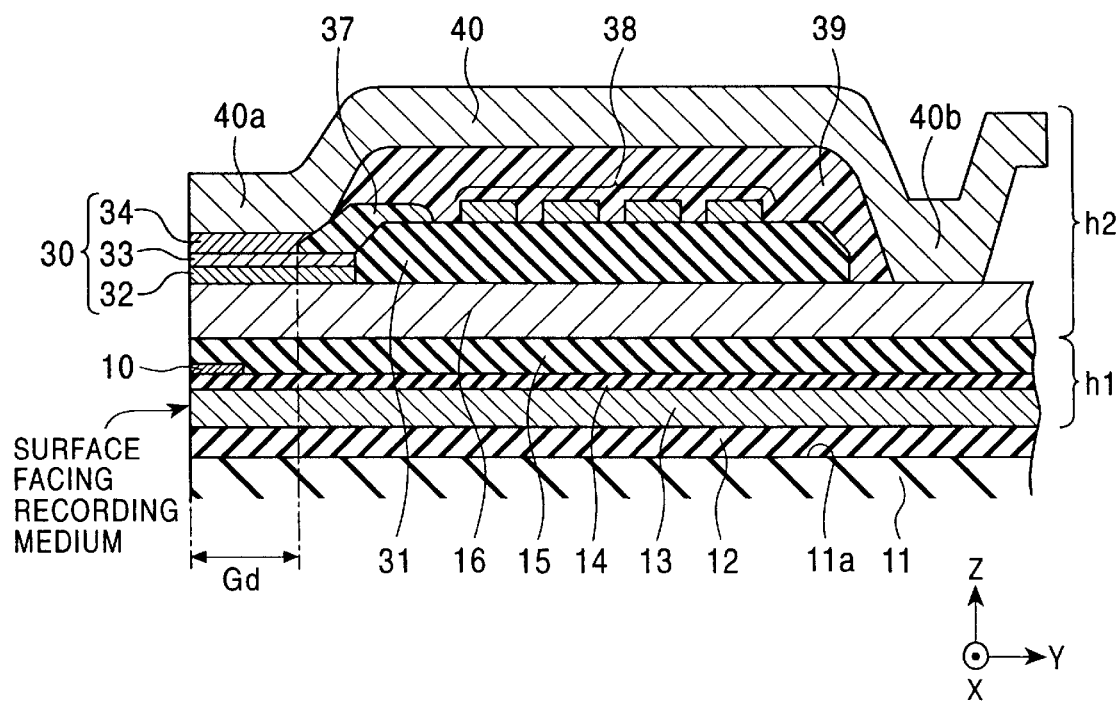
FIG. 4 is a longitudinal sectional view of the thin film magnetic head shown in FIG. 3.

FIG. 3 is a partial front view of a thin film magnetic head according to a second embodiment of the present invention, and FIG. 4 is a longitudinal sectional view of the thin film magnetic head taken along lien IV—IV in FIG. 3, as viewed from direction of arrows.

In this embodiment, the structure of the MR head h1 is the same as FIGS. 1 and 2.

As shown in FIG. 3, an insulating layer 31 is formed on the lower core layer 16. The insulating layer 31 has a track width forming trench 31a which is formed with a predetermined length dimension from the surface facing the recording medium in the height direction (the Y direction shown in the drawing). The track width forming trench 31a is formed with the track width Tw at the surface facing the recording medium (refer to FIG. 3).

In the track width forming trench 31a, a lower pole layer 32, a nonmagnetic gap layer 33 and an upper pole layer 34 are laminated to form a pole portion 30.

The lower pole layer 32 is formed by plating directly on the lower core layer 16. The gap layer 33 formed on the lower pole layer 32 is preferably made of a nonmagnetic metal material which can be plated. Specifically, at least one selected from NiP, NiPd, NiW, NiMo, Au, Pt, Rh, Pd, Ru, and Cr is preferably used.

In a specified embodiment of the present invention, NiP is used for the gap layer 33. By using NIP for forming the gap layer 33, the gap layer 33 can be appropriately put into a nonmagnetic state.

The pole portion 30 may comprise two layers including the gap layer 33 and the upper pole layer 34.

Furthermore, a Gd-determining layer 37 is formed on the gap layer 33 so as to extend from the position at a distance of gap depth (Gd) from the surface facing the recording medium to the top of the insulating layer 31.

The upper pole layer 34 formed on the gap layer 33 is magnetically connected to an upper core layer 40 formed on the upper pole layer 34.

When the gap layer 33 is made of a nonmagnetic metal material which can be plated, the lower pole layer 32, the gap layer 33 and the upper pole layer 34 can be continuously formed by plating.

As shown in FIG. 4, a coil layer 38 is formed in a spiral pattern on the insulating layer 31. Also, an insulating layer 39 made of an organic insulating material is coated on the coil layer 38.

As shown in FIG. 3, inclined surfaces 31c are formed at both side ends of the track width forming trench 31a in the track width direction (the X direction shown in the drawing) to extend from the top of the upper pole layer 34 to the top 31b of the insulating layer 31 so that the width dimension gradually increases away from the lower core layer 16.

As shown in FIG. 3, the front end 40a of the upper core layer 40 is formed to extend from the top of the upper pole layer 34 along the inclined surface 31c and inclined away from the lower core layer 16.

As shown in FIG. 4, the upper core layer 40 is formed on the insulating layer 39 to extend from the surface facing the recording medium in the height direction (the Y direction), and the base end 40b of the upper core layer 40 is formed directly on the lower core layer 16.

In the second embodiment shown in FIGS. 3 and 4, the lower pole layer 32 and/or the upper pole layer 34 is made of a NiFe alloy having the composition ratio and average crystal grain diameter described above in (1) or (2).

By using the NiFe alloy having a high saturation magnetic flux density Bs of 1.9 T or more or 1.95 T or more for forming the lower pole layer 32 and the upper pole layer 34, a magnetic flux can be concentrated in the vicinity of the gap to improve the recording density, and a thin film magnetic head adaptable to a higher recording density in future can be manufactured. In the present invention, the saturation magnetic flux density Bs of the NiFe alloy can be increased to 2.0 T or more.

By forming the NiFe alloy within the above composition range, a crystal can be densely formed to suppress surface roughness of the film plane, thereby improving the corrosion resistance of the thin film magnetic head.

In each of the embodiments shown in FIGS. 1 to 4, the pole portion 18 or 30 is present between the lower core layer 16 and the upper core layer 22 or 40, and the lower pole layer 19 or 32 and/or the upper pole layer 21 or 34, which constitute the pole portion 18 or 30, is made of the NiFe alloy having the composition ratio and the average crystal grain diameter described above in (1) or (2). In the present invention, the lower pole layer 19 or 32 and/or the upper pole layer 21 or 34 may comprise a lamination of at least two magnetic layers. In this construction, the magnetic layer in contact with the gap layer 20 or 33 is preferably made of the NiFe alloy (1) or (2). As a result, a magnetic flux can be concentrated in the vicinity of the gap, thereby permitting the manufacture of a thin film magnetic head adaptable to a higher recording density in future.

The magnetic layer other than the magnetic layer in contact with the gap layer 20 or 33 is preferably made of a NiFe alloy having a lower Fe composition ratio than that of the magnetic layer in contact with the gap layer 20 or 33. This can increase the saturation magnetic flux density Bs of the magnetic layer in contact with the gap layer 20 or 33 to a higher value than that of the other magnetic layer, and thus the magnetic flux can be appropriately concentrated in the vicinity of the gap. The other magnetic layer need not be made of the NiFe alloy, and may be made of a CoFe alloy, CoFeNi, or the like, for example. In this case, the composition ratio must be appropriately controlled so that the saturation magnetic flux density Bs of the other magnetic layer is lower than that of the other magnetic layer in contact with the gap layer 20 or 33.

The saturation magnetic flux density Bs of the lower pole layer 19 or 32 is preferably as high as possible. However, when the saturation magnetic flux density Bs of the lower pole layer 19 or 32 is lower than that of the upper pole layer 12 or 34, magnetic reversal of a leakage magnetic field between the lower and upper pole layers can be facilitated to increase the write density of a signal on the recording medium.

The lower core layer 16 and the upper core layer 22 or 40 may be made of the NiFe alloy (1) or (2). In this case, the Fe composition ratio of the NiFe alloy is preferably controlled so that the saturation magnetic flux densities Bs of the upper pole layer 21 or 34 and the lower pole layer 19 or 32 are higher than those of the lower core layer 16 and the upper core layer 22 or 40.

Figure 5:
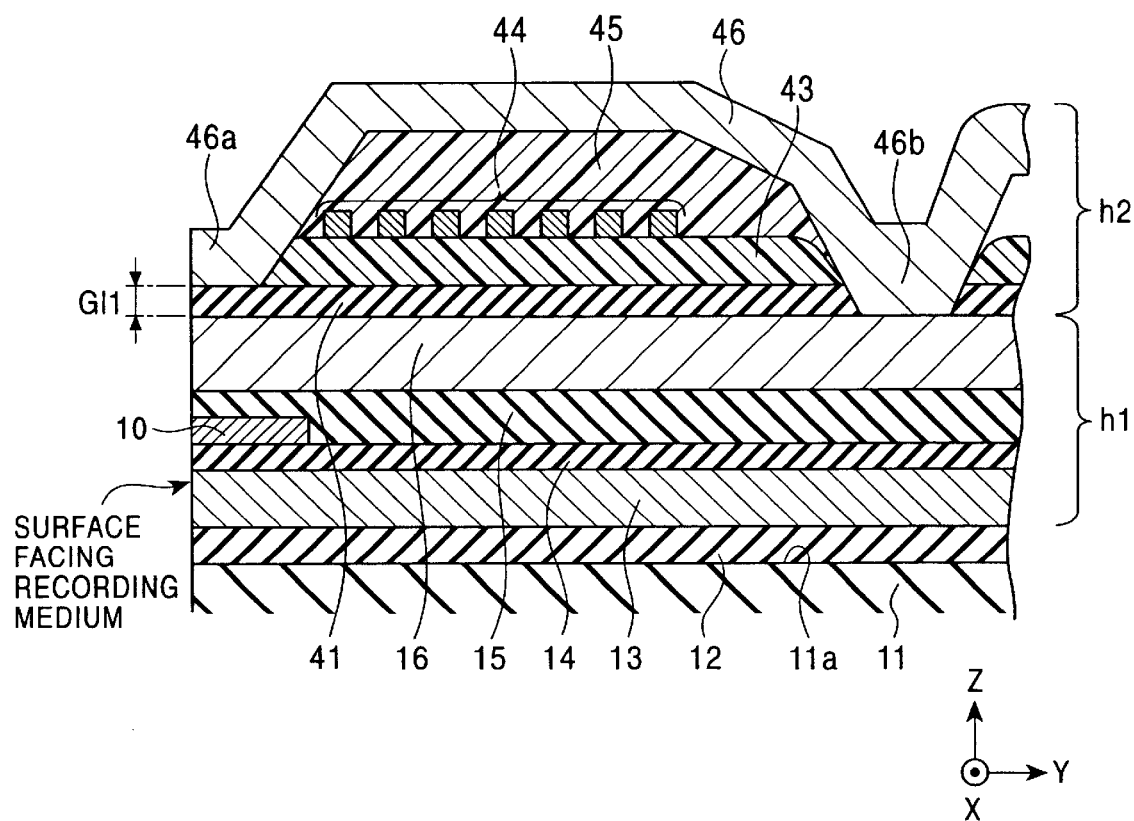
FIG. 5 is a longitudinal sectional view of a thin film magnetic head according to a third embodiment of the present invention.

FIG. 5 is a longitudinal sectional view of a thin film magnetic head according to a third embodiment of the present invention.

In this embodiment, the MR head h1 is the same as shown in FIG. 1. As shown in FIG. 5, a magnetic gap layer (nonmagnetic material layer) 41 made of alumina or the like is formed on the lower core layer 16. Furthermore, a coil layer 44 is provided in a spiral planar pattern on the magnetic gap layer 41 with an insulating layer 43 of polyimide or a resist material provided therebetween. The coil layer 44 is made of a nonmagnetic conductive material such as Cu (copper) or the like, which has a low electric resistance.

The coil layer 44 is surrounded by an insulating layer 45 made of polyimide or a resist material, and an upper core layer 46 made of a soft magnetic material is formed on the insulating layer 45.

As shown in FIG. 5, the front end 46a of the upper core layer 46 is opposed to the lower core layer 16 with the magnetic gap layer 41 provided therebetween at the surface facing the recording medium to form a magnetic gap having a magnetic gap length G11. As shown in FIG. 5, the base end 46b of the upper core layer 46 is magnetically connected to the lower core layer 16.

In the present invention, the lower core layer 16 and/or the upper core layer 46 is made of a NiFe alloy having the composition ratio and the average crystal grain diameter described above in (1) or (2). The NiFe alloy of the present invention has a saturation magnetic flux density Bs of as high as 1.9 T or more or 1.95 T or more, and a saturation magnetic flux density of as high as 2.0 T or more can be obtained according to the composition ratio.

By forming the upper core layer 46 and/or the lower core layer 16 using the NiFe alloy having a saturation magnetic flux density Bs of as high as 1.9 T or more or 1.95 or more, a magnetic flux can be concentrated in the vicinity of the gap to improve the recording density, thereby permitting the production of a thin film magnetic head excellent for a higher recording density.

In the NiFe alloy (1) or (2), the crystal is densely formed, and the surface roughness of the film plane can be suppressed to improve corrosion resistance of a thin film magnetic head. In the present invention, the center line average roughness Ra of the film plane can be decreased to 10 nm or less, and the center line average roughness Ra is preferably 7 nm or less. Also, the coercive force Hc can be decreased to, for example, 553 (A/m) or less.

By using the NiFe alloy (1) or (2), a resistivity of 30 ($\mu\Omega$·cm) or more can be obtained, and the membrane stress can be decreased to 400 MPa or less.

Figure 6:
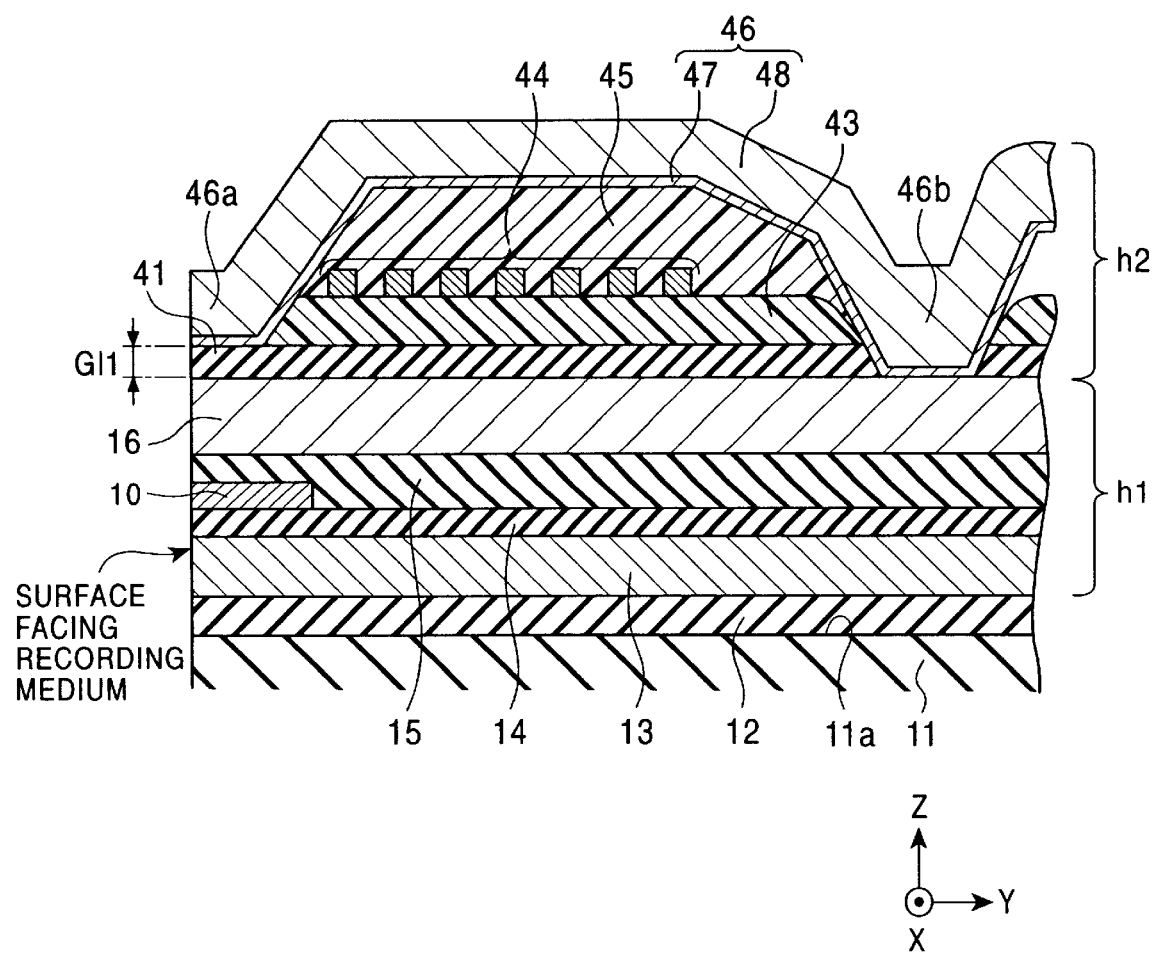
FIG. 6 is a longitudinal sectional view of a thin film magnetic head according to a fourth embodiment of the present invention.

FIG. 6 is a longitudinal sectional view of a thin film magnetic head according to a fourth embodiment of the present invention.

The thin film magnetic head shown in FIG. 6 is different from that shown in FIG. 5 in that an upper core layer 46 comprises a lamination of two magnetic layers.

The upper core layer 46 comprises a high-Bs layer 47 having a high saturation magnetic flux density Bs and an upper layer 48 laminated thereon.

The high-Bs layer 47 is made of a NiFe alloy having the composition ratio and the average crystal grain diameter described above in (1) or (2).

Consequently, the saturation magnetic flux density Bs of the high-Bs layer 47 can be increased to at least 1.9 T or more, or 1.95 T or more, and preferably 2.0 T or more.

In the high-Bs layer 47 made of the NiFe alloy (1) or (2), the crystal is densely formed, and the surface roughness of the film plane of the high-Bs layer 47 can be decreased to improve corrosion resistance and decrease coercive force Hc. Specifically, the center line average roughness Rs of the film plane can be decreased to 10 nm or less, and the coercive force Hc can be decreased to 553 (A/m) or less. By using the NiFe alloy, resistivity can be increased to 30 or more, and the membrane stress ($\mu\Omega$·cm) can be decreased to 400 MPa or less.

The upper layer 48 which constitutes the upper core layer 46 has a lower saturation magnetic flux density Bs than the high-Bs layer 47, but the resistivity is higher than that of the high-Bs layer 47. The upper layer 48 is made of, for example, a NiFe alloy. In this case, the Fe content of the upper layer 48 is preferably lower than that of the high-Bs layer 47. Consequently, the high-Bs layer 47 has a higher saturation magnetic flux density Bs than the upper layer 48, and a magnetic flux can be concentrated in the vicinity of the gap to improve recording resolution. The upper layer 48 need not be made of the NiFe alloy, and may be made of, for example, a CoFe alloy, CoFeNi, or the like. In this case, the composition ratio of the soft magnetic material which forms the upper layer 48 is preferably controlled so that the saturation magnetic flux density Bs of the high-Bs layer 47 is higher than that of the upper layer 48.

By providing the upper layer 48 having high resistivity in the upper core layer 46, a loss due to an eddy current produced by an increase in the recording frequency can be decreased, and a thin film magnetic head adaptable to a higher recording frequency in future can be manufactured.

As shown in FIG. 6, in the present invention, the high-Bs layer 47 is preferably formed on the lower side facing the gap layer 41. The high-Bs layer 47 may be formed only at the front end 46a of the upper core layer 46 in direct contact with the gap layer 41.

The lower core layer 16 may comprise two layers including a high-Bs layer and a high-resistivity layer. In this structure, the high-Bs layer is formed on the high-resistivity layer so that the high-Bs layer faces the upper core layer 46 with the gap layer 41 provided therebetween.

Although, in the embodiment shown in FIG. 6, the upper core layer 46 has a two-layer laminated structure, the upper core layer 46 may comprise three layers or more. In this structure, the high-Bs layer 47 is preferably formed on the side in contact with the magnetic gap layer 41.

Figure 7:
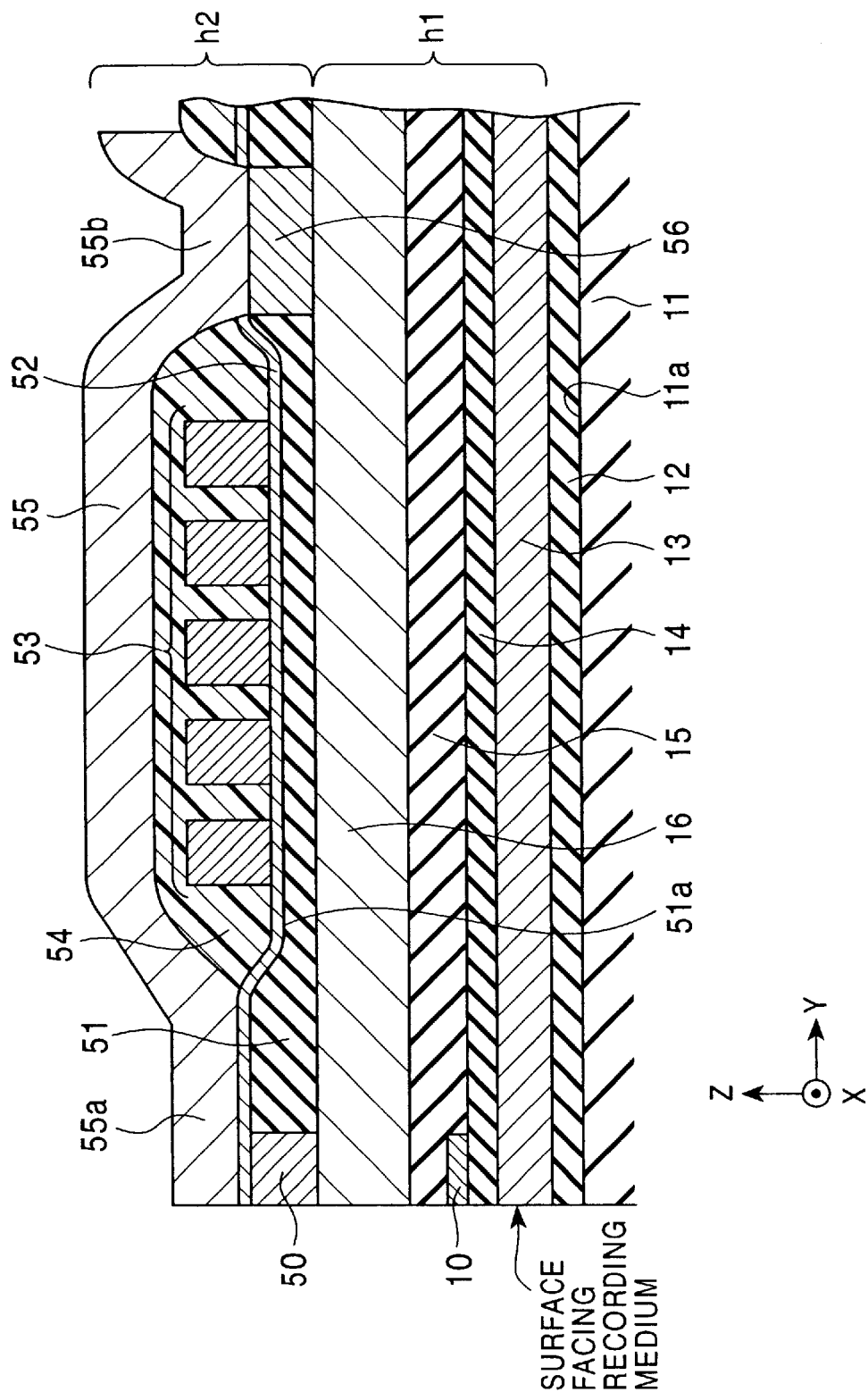
FIG. 7 is a longitudinal sectional view of a thin film magnetic head according to a fifth embodiment of the present invention.

FIG. 7 is a longitudinal sectional view of a thin film magnetic head according to a fifth embodiment of the present invention.

In the embodiment shown in FIG. 7, the construction of the MR head h1 is the same as shown in FIG. 1. As shown in FIG. 7, a lower pole layer 50 is formed on the lower core layer 16 to extend from the surface facing the recording medium. Also, an insulating layer 51 is formed behind the lower pole layer 50 in the height direction (the Y direction shown in the drawing). The upper surface of the insulating layer 51 is recessed to form a coil formation surface 51*a*.

A gap layer 52 is formed on the lower pole layer 50 and the insulating layer 51. Furthermore, a coil layer 53 is formed on the coil formation surface 51*a* of the insulating layer 51 with the gap layer 52 provided therebetween. The coil layer 53 is coated with an insulating layer 54 made of an organic insulating material.

As shown in FIG. 7, an upper core layer 55 is patterned by, for example, a frame plating method, to extend from the gap layer 52 to the insulating layer 54.

The front end 55*a* of the upper core layer 55 is opposed to the lower pole layer 50 with the gap layer 52 provided therebetween. The base end 55*b* of the upper core layer 55 is magnetically connected to the lower core layer 16 through a raised layer 56 formed on the lower core layer 16.

In this embodiment, the upper core layer 55 and/or the lower pole layer 50 is made of a NiFe alloy having the composition ratio and the average crystal grain diameter described above in (1) or (2).

In FIG. 7, when the lower pole layer 50 is made of the NiFe alloy having a higher saturation magnetic flux density Bs than the lower core layer 16, a magnetic flux can be concentrated in the vicinity of the gap to improve the recording density.

The whole of the upper core layer 55 may be made of the NiFe alloy, but like in FIG. 6, the upper core layer 55 may have a laminated structure comprising at least two layers in which a high-Bs layer facing the gap layer 52 may be made of the NiFe alloy. In this case, only the front end 55*a* of the upper core layer 55 preferably comprises a laminated structure comprising at least two magnetic layers, in which the high-Bs layer is formed in contact with the gap layer 52. This is because the magnetic flux can be concentrated in the vicinity of the gap to improve the recording density.

In the present invention, in each of the embodiments shown in FIGS. 1 to 7, the NiFe alloy film is preferably formed by plating. In the present invention, the NiFe alloy can be plated by an electroplating method using a pulsed current.

The NiFe alloy can be plated to any desired thickness larger than that of a film formed by sputtering.

Although, in each of the embodiments, reference numeral 16 denotes a layer serving as both the lower core layer and the upper shield layer, the lower core layer and the upper shield layer may be separately formed. In this case, an insulating layer is interposed between the lower core layer and the upper shield layer.

A general method of manufacturing each of the thin film magnetic heads shown in FIGS. 1 to 7 will be described below.

In the thin film magnetic head shown in FIGS. 1 and 2, the Gd-determining layer 17 is formed on the lower core layer 16, and then the lower pole layer 19, the nonmagnetic gap layer 20 and the upper pole layer 21 are continuously formed by plating using resist to form the pole portion 18 extending from the surface facing the recording medium in the height direction. Next, the insulating layer 23 is formed behind the pole portion 18 in the height direction, and then the upper surfaces of the pole portion 18 and the insulating layer 23 are planarized to be made coplanar by, for example, a CMP technique. Then, the coil layer 24 is formed in a spiral pattern on the insulating layer 23, and the insulating layer 25 is formed on the coil layer 24. Then, the upper core layer 22 is formed on the pole portion 18 and the insulating layer 25 by, for example, the frame plating method.

In the thin film magnetic head shown in FIGS. 3 and 4, the insulating layer 31 is formed on the lower core layer 16, and then the track width forming trench 31*a* is formed in the insulating layer 31 to extend backward from the surface facing the recording medium in the height direction. Then, the inclined surfaces 31*c* shown in FIG. 3 are formed in the track width forming trench 31*a*.

Then, the lower pole layer 32 and the nonmagnetic gap layer 33 are formed in the track width forming trench 31*a*. Then, the Gd-determining layer 37 is formed to extend from the gap layer 33 to the insulating layer 31, and the upper pole layer 34 is formed on the gap layer 33 by plating. Next, the coil layer 38 is formed in a spiral pattern on the insulating layer 31, and the insulating layer 39 is formed on the coil layer 38. Then, the upper core layer 40 is formed on the upper pole layer 34 and the insulating layer 39 by, for example, the frame plating method.

In each of the thin film magnetic heads shown in FIGS. 5 and 6, the gap layer 41 is first formed on the lower core layer 16, and the insulating layer 43 is formed. Then, the coil layer 44 is formed in a pattern on the insulating layer 43, and the insulating 45 is formed on the coil layer 44. Then, the upper core layer 46 is patterned on the gap layer 41 and the insulating layer 45 by the frame plating method.

In the thin film magnetic head shown in FIG. 7, the lower pole layer 50 is first formed on the lower core layer 16 by using resist, and then the insulating layer 51 is formed behind the lower pole layer 50 in the height direction. The upper surfaces of the lower pole layer 50 and the insulating layer 51 are planarized by the CMP technique, and then the coil formation concave surface 51*a* is formed at the top of the insulating layer 51. Next, the gap layer 52 is formed on the lower pole layer 50 and the insulating layer 51, and then the coil layer 53 is formed in a spiral pattern on the gap layer 52. Furthermore, the insulating layer 54 is formed on the coil layer 53. Then, the upper core layer 55 is patterned on the gap layer 52 and the insulating layer 54 by, for example, the frame plating method.

Description will now be made of a method of plating the NiFe alloy (1) having a Fe composition ratio of 76% by mass to 90% by mass, or the NiFe alloy (2) having an average crystal grain diameter of 130 Å to 175 Å, and a Fe composition ratio of 70% by mass to 90% by mass according to the present invention.

In the present invention, the NiFe alloy is plated by the electroplating method using a pulsed current.

In the electroplating method using the pulsed current, for example, the current control device is repeatedly turned on and off to provide the time to pass the current and the blank time to pass no current during plating. By providing the time to pass no current, a NiFe alloy film can be slowly formed by plating, and even when the Fe ion concentration of the plating bath is increased, the deviation of the current density distribution in plating can thus be reduced, as compared with a conventional plating method using a DC current.

The pulsed current is repeatedly turned on and off, for example, in a cycle of several seconds, and the duty ratio is preferably about 0.1 to 0.5. The condition of the pulsed current influences the average crystal grain diameter of the NiFe alloy and the center line average roughness Ra of the film plane.

As described above, in electroplating using the pulsed current, the deviation of the current density distribution in plating can be reduced to increase the Fe content of the NiFe alloy, as compared with the conventional electroplating method using the Dc current.

Furthermore, in the present invention, the composition of the plating bath used for plating the NiFe alloy is set as follows:

In the present invention, the Ni ion concentration of the plating bath is 6.6 g/l to 20 g/l, and the ratio of the Fe ion concentration to the Ni ion concentration is 0.15 to 0.36.

Although, in the present invention, the Ni ion concentration is set to 6.6 g/l to 20 g/l, the Ni ion concentration is conventionally about 40 g/l. Therefore, in the present invention, the Ni ion concentration is lower than the conventional value.

Therefore, during deposition, the amount of the Ni ions in the plating bath, which contact the surface of a cathode (the plated side) can be decreased to increase the Fe content of the NiFe alloy due to the improved agitation effect.

In the present invention, furthermore, the ratio of the Fe ion concentration to the Ni ion concentration is set to 0.15 to 0.36. Namely, in the present invention, not only the Ni ion concentration but also the ratio to the Fe ion concentration is defined to permit the formation of a dense crystal with high crystallinity. In the present invention, the Ni ion concentration is decreased, and the concentration ratio is set to the above value, promoting crystallization. Therefore, the average crystal grain diameter of the NiFe alloy can be increased, and a dense crystal can be formed to stably obtain a high saturation magnetic flux density Bs. Furthermore, the coercive force Hc, surface roughness and membrane stress can be decreased.

In the present invention, by setting the Ni ion concentration of the plating bath to 6.6 g/l to 20 g/l, and the ratio of the Fe ion concentration to the Ni ion concentration to 0.15 to 0.36, the NiFe alloy having a Fe composition ratio of 76% by mass to 90% by mass, or an average crystal grain diameter of 130 Å to 175 Å and a Fe composition ratio of 70% by mass to 90% by mass can be plated with high reproducibility.

In the present invention, when the Ni ion concentration is set to 10 g/l or more, the ratio of Fe ion concentration/Ni ion concentration is preferably 0.2 to 0.35.

In this case, the NiFe alloy having a Fe composition ratio of 76% by mass to 90% by mass, or an average crystal grain diameter of 130 Å to 175 Å and a Fe composition ratio of 70% by mass to 90% by mass can be plated with high reproducibility.

On the other hand, when the Ni ion concentration is set to 10 g/l or less, the ratio of Fe ion concentration/Ni ion concentration is preferably 0.15 to 0.36.

In this case, the NiFe alloy having a Fe composition ratio of 76% by mass to 90% by mass, or an average crystal grain diameter of 130 Å to 175 Å and a Fe composition ratio of 70% by mass to 90% by mass can be plated with high reproducibility.

When the Ni ion concentration is set to a low value of 10 g/l or less, the ratio of Fe ion concentration/Ni ion concentration can be set to 0.15 to 0.36, and thus the range of the ratio of Fe ion concentration/Ni ion concentration can be widened, as compared with the case in which the Ni ion concentration is set to 10 g/l or more. Therefore, the Ni ion concentration is preferably set to a low value of 10 g/l or less because the ratio of Fe ion concentration/Ni ion concentration can easily be controlled.

In the present invention, saccharin sodium ($C_6H_4CONNaSO_2$) is preferably mixed with the plating bath of the NiFe alloy. Saccharin sodium ($C_6H_4CONNaSO_2$) has the function as a stress relaxant, and the membrane stress of the NiFe alloy can be decreased by mixing saccharin sodium.

In the present invention, 2-butine-1,4-diol is preferably mixed with the plating bath. This can suppress coarsening of the crystal grains of the NiFe alloy to decrease coercive force Hc.

In the present invention, sodium 2-ethylhexyl sulfate is preferably mixed with the plating bath.

The sodium 2-ethylhexyl sulfate serves as a surfactant, and can remove hydrogen produced in the plating bath during plating of the NiFe alloy, thereby preventing adhesion of hydrogen to the plated film. When hydrogen adheres to the plated film, the crystal is not densely formed, deteriorating the surface roughness of the film plane. Therefore, in the present invention, by removing hydrogen, the surface roughness of the plate film plane can be decreased to decrease coercive force Hc.

Although sodium lauryl sulfate may be used instead of sodium 2-ethylhexyl sulfate, sodium lauryl sulfate easily produces bubbles in mixing with the plating bath, as compared with sodium 2-ethylhexyl sulfate, causing difficulties in mixing sodium lauryl sulfate in an amount sufficient for effectively removing hydrogen. Therefore, in the present invention, sodium 2-ethylhexyl sulfate, which produces less bubbles than sodium lauryl sulfate, is preferably mixed in an amount sufficient for effectively removing hydrogen.

Also, boric acid is preferably mixed with the plating bath. The boric acid serves as a pH buffer for an electrode surface, and is effective to impart glossiness to the plated film.

Although, in the present invention, the NiFe alloy having the composition ratio and the crystal grain diameter described above in (1) or (2) is applied to each of the thin film magnetic heads shown in FIGS. 1 to 7, application is not limited to this. For example, the NiFe alloy can be used for plane-shape magnetic devices such as a thin film inductor, and the like.

EXAMPLES

In the present invention, a NiFe alloy was plated by the electroplating method using a pulsed current and a plating bath. In this case, the Ni ion concentration of the plating bath and the ratio of Fe ion concentration/Ni ion concentration were changed to plate a plurality of NiFe alloys having different composition ratios.

Table 1 shows plating bath compositions (comparative example 1) having a Ni ion concentration fixed at 40.07 g/l and different ratios of Fe ion concentration/Ni ion concentration.

TABLE 1

| (A) Bath having Fe ion/Ni ion ratio of 0.16 or less | | |
|---|---|---|
| Fe ion | 5.02, 6.03 | g/l |
| Ni ion | 40.07 | g/l |
| Saccharin sodium | 2 | g/l |
| Sodium lauryl sulfate | 0.02 | g/l |
| Boric acid | 25 | g/l |
| Sodium chloride | 25 | g/l |
| (B) Bath having Fe ion/Ni ion ratio of 0.16 or more | | |
| Fe ion | 7.17 | g/l |
| Ni ion | 40.07 | g/l |
| Saccharin sodium | 2 | g/l |
| Sodium lauryl sulfate | 0.02 | g/l |

TABLE 1-continued

| | | |
|---|---|---|
| Boric acid | 25 | g/l |
| Sodium chloride | 25 | g/l |
| Pulse ON-Time | 400 | msec |
| (C) Bath having Fe ion/Ni ion ratio of 0.18 or more | | |
| Fe ion | 7.17 | g/l |
| Ni ion | 40.07 | g/l |
| Saccharin sodium | 2 | g/l |
| Sodium lauryl sulfate | 0.02 | g/l |
| Boric acid | 25 | g/l |
| Sodium chloride | 25 | g/l |
| Pulse ON-Time | 200, 300, 600 | msec |

In experiment, the temperature of the plating bath was set to 30° C., pH of an electrode was set to 2.8, and the current density was set to 46.8 mA/cm$^2$. Also, a Fe electrode was used as an anode-side electrode.

The soft magnetic properties and film properties of a NiFe alloy film formed by plating using each of the above plating bath compositions shown in Table 1 were as shown in Table 2 below.

TABLE 2

| | |
|---|---|
| (A) Deposited product | |
| Fe composition | 52% by mass to 60% by mass |
| Bs | 1.7 T or less |
| Surface roughness | 5 nm or less |
| Membrane stress | 150 MPa or less |
| (B) Deposited product | |
| Fe composition | 70% by mass to 76% by mass |
| Bs | 1.89 T or less |
| Surface roughness | 6 nm or less |
| Membrane stress | 80 MPa to 190 MPa |
| (C) Deposited product | |
| Fe composition | 70% by mass to 76% by mass |
| Bs | 1.89 T or less |
| Surface roughness | 6 nm or less |
| Membrane stress | 150 MPa or more |

The deposited product (A) shown in Table 2 corresponds to the NiFe alloy obtained from the bath (A) having a Fe ion/Hi ion ratio of 0.16 or less shown in Table 1; the deposited product (B) shown in Table 2 corresponds to the NiFe alloy obtained from the bath (B) having a Fe ion/Hi ion ratio of 0.16 or more shown in Table 1; the deposited product (C) shown in Table 2 corresponds to the NiFe alloy obtained from the bath (C) having a Fe ion/Hi ion ratio of 0.16 or more shown in Table 1.

The deposited product (A) shown in Table 2 had a Fe composition ratio of 60% by mass or less, and a saturation magnetic flux density Bs of as low as 1.7 T or less. Both the deposited products (B) and (C) sometimes had a Fe composition ratio of 70% by mass or more, but the saturation magnetic flux density Bs was 1.9 T or less, and a saturation magnetic flux density Bs of 1.9 T or more could not be obtained.

With any one of the NiFe alloys obtained from the plating bath compositions shown in Table 1, only a saturation magnetic flux density Bs of 1.9 T or less can be obtained. This is because the Ni concentration of the plating bath is as high as 40.07 g/l to increase the amount of Ni of the plating bath, which contacts the surface of the cathode (the plated side) during deposition, thereby failing to increase the Fe content of the film due to deterioration in the agitation effect. Also, the Fe ions are not appropriately supplied due to deterioration in the agitation effect to slow down crystallization, thereby producing crystal grain boundaries during the step of crystal growth, and easily producing voids between crystal grains to possibly fail to form a dense crystal. In all the NiFe alloys shown in Table 2, the average crystal grain diameter was 130 Å or less.

In the present invention, according to the above-described experimental results, the Ni ion concentration is set to a low value, and the ratio of Fe ion concentration/Ni ion concentration is appropriately controlled, as described below.

Table 3 shows a plating bath composition (Example 1) having a Ni ion concentration fixed at 19.91 g/l, which was about ½ of the Ni ion concentration shown in Table 1, and a ratio of Fe ion concentration/Ni ion concentration of 0.2 to 0.35.

TABLE 3

| Bath having Fe ion/Ni ion ratio of 0.2 to 0.35 | | |
|---|---|---|
| Fe ion | 4.02, 5.02, 6.03 | g/l |
| Ni ion | 19.91 | g/l |
| Saccharin sodium | 2 | g/l |
| Sodium lauryl sulfate | 0.02 | g/l |
| Boric acid | 25 | g/l |
| Sodium chloride | 25 | g/l |

The temperature of the plating bath was set to 30° C., pH of an electrode was set to 2.8, and the current density was set to 46.8 mA/cm$^2$. Also, the duty ratio (ON/OFF) of the pulsed current was set to $^{400}/_{1000}$ msec, and a Fe electrode was used as an anode-side electrode. These conditions were experimental conditions common to the NiFe alloys formed from the plating baths shown in Tables 5, 7, 9, 11 and 13 below.

The soft magnetic properties and film properties of the NiFe alloy film formed from the plating bath composition shown in Table 3 are shown in Table 4 below.

TABLE 4

| Deposited product | |
|---|---|
| Fe composition | 73% by mass to 78.6% by mass |
| Bs | 1.9 T to 2 T |
| Surface roughness | 7 nm or less |
| Membrane stress | 290 MPa to 550 MPa |

Table 4 indicates that the NiFe alloy has a Fe composition ratio of 74% by mass to 78.6% by mass, and a saturation magnetic flux density Bs of 1.9 T or more. Furthermore, the film plane has low surface roughness, and the center line average roughness Ra is 7 nm or less. Furthermore, the membrane stress is as low as 290 MPa to 550 MPa.

In this way, when the Ni ion concentration of the plating bath is a low value of about ½ of the Ni ion concentration shown in Table 1, and the Fe ion concentration/Ni ion concentration ratio is 0.2 to 0.35, the Fe composition ratio of the Fe alloy can be securely increased to 70% by mass. In addition, the average crystal grain diameter can be increased to 130 Å or more, and a crystal can be densely formed, thereby stably achieving a saturation magnetic flux density Bs of 1.9 T or more, and appropriately suppressing surface roughness of the film plane.

Table 5 shows a plating bath composition (comparative example 2) having a Ni ion concentration fixed at 19.91 g/l, which was about ½ of the Ni ion concentration shown in Table 1, and a ratio of Fe ion concentration/Ni ion concentration of 0.35 or more.

TABLE 5

Bath having Fe ion/Ni ion ratio of 0.35 or more

| | | |
|---|---|---|
| Fe ion | 7.03 | g/l |
| Ni ion | 19.91 | g/l |
| Saccharin sodium | 2 | g/l |
| Sodium lauryl sulfate | 0.02 | g/l |
| Boric acid | 25 | g/l |
| Sodium chloride | 25 | g/l |

The soft magnetic properties and film properties of the NiFe alloy film formed from the plating bath composition shown in Table 5 are shown in Table 6 below.

TABLE 6

Deposited product

| | |
|---|---|
| Fe composition | 78.8% by mass to 80% by mass |
| Bs | 1.9 T to 2 T |
| Surface roughness | 9 nm or less |
| Membrane stress | 560 MPa or more |

Table 6 indicates that the NiFe alloy has a Fe composition ratio of 78.8% by mass to 80% by mass, and a saturation magnetic flux density Bs of 1.9 T or more. However, the film plane has a high degree of surface roughness, and the center line average roughness Ra is 9 nm or more higher than that shown in Table 4. Furthermore, the membrane stress is 560 MPa or more, which is higher than that shown in Table 4.

In this way, when the center line average roughness increases, corrosion resistance decreases, and the saturation magnetic flux density Bs undesirably greatly varies.

Although the plating bath compositions shown in Tables 4 and 6 have the same Ni ion concentration, both compositions have different ratios to the Fe ion concentration. It is thus found that various magnetic properties and film properties such as the saturation magnetic flux density Bs, the center line average roughness Ra of the film plane, the membrane stress, etc. cannot be improved unless the ratio of Fe ion concentration/Ni ion concentration is controlled in an appropriate range.

Comparison between Tables 4 and 6 reveals that the various magnetic properties and film properties shown in Table 4 are more desirable than those shown in Table 6.

Table 7 shows a plating bath composition (example 2) having a Ni ion concentration fixed at 10.31 g/l, which was about ¼ of the Ni ion concentration shown in Table 1, and a ratio of Fe ion concentration/Ni ion concentration of 0.234 to 0.35.

TABLE 7

Bath having Fe ion/Ni ion ratio of 0.234 to 0.35

| | | |
|---|---|---|
| Fe ion | 2.81, 3.01, 3.21 | g/l |
| Ni ion | 10.31 | g/l |
| Saccharin sodium | 2 | g/l |
| Sodium lauryl sulfate | 0.02 | g/l |
| Boric acid | 25 | g/l |
| Sodium chloride | 25 | g/l |

The soft magnetic properties and film properties of the NiFe alloy film formed from the plating bath composition shown in Table 7 are shown in Table 8 below.

TABLE 8

Deposited product

| | |
|---|---|
| Fe composition | 70.5% by mass to 81% by mass |
| Bs | 1.9 T to 2.0 T |
| Surface roughness | 2.9 nm to 20 nm |
| Membrane stress | 90 MPa to 300 MPa |

Table 8 indicates that the NiFe alloy has a Fe composition ratio of 70% by mass to 81% by mass, and a saturation magnetic flux density Bs of 1.9 T or more.

Comparison between Tables 8 and 4 reveals that the Fe content shown in Table 8 is higher than that shown in Table 4. This is because the Ni ion concentration of the plating bath is further decreased to improve the agitation effect. The NiFe alloy shown in Table 8 had an average crystal grain diameter of 130 Å or more.

Table 9 shows a plating bath composition (comparative example 3) having a Ni ion concentration fixed at 10.31 g/l, which was about ¼ of the Ni ion concentration shown in Table 1, and a ratio of Fe ion concentration/Ni ion concentration of 0.35 or more.

TABLE 9

Bath having Fe ion/Ni ion ratio of 0.35 or more

| | | |
|---|---|---|
| Fe ion | 4.02 | g/l |
| Ni ion | 10.31 | g/l |
| Saccharin sodium | 2 | g/l |
| Sodium lauryl sulfate | 0.02 | g/l |
| Boric acid | 25 | g/l |
| Sodium chloride | 25 | g/l |

The soft magnetic properties and film properties of the NiFe alloy film formed from the plating bath composition shown in Table 9 are shown in Table 10 below.

TABLE 10

Deposited product

| | |
|---|---|
| Fe composition | 79% by mass to 82% by mass |
| Bs | 1.9 T to 2 T |
| Surface roughness | 14 nm or more |
| Membrane stress | 400 MPa or more |

Table 10 indicates that the NiFe alloy has a Fe composition ratio of 79% by mass to 82% by mass, and a saturation magnetic flux density Bs of 1.9 T or more. However, the center line average roughness Ra of the film plane is easily increased to fail to appropriately suppress surface roughness of the film plane, and the membrane stress is increased to 400 MPa or more.

Comparison between Tables 8 and 10 reveals that the soft magnetic properties and film properties shown in Table 8 are more desirable than those shown in Table 10.

Table 11 shows a plating bath composition (Example 3) having a Ni ion concentration fixed at 6.68 g/l, which was about ⅙ of the Ni ion concentration shown in Table 1, and a ratio of Fe ion concentration/Ni ion concentration of 0.156 to 0.36.

TABLE 11

Bath having Fe ion/Ni ion ratio of 0.156 to 0.36

| | |
|---|---|
| Fe ion | 1.61, 1.81, 2.01, 2.21, 2.41 g/l |
| Ni ion | 6.68 g/l |
| Saccharin sodium | 2 g/l |
| Sodium lauryl sulfate | 0.02 g/l |
| Boric acid | 25 g/l |
| Sodium chloride | 25 g/l |

The soft magnetic properties and film properties of the NiFe alloy film formed from the plating bath composition shown in Table 11 are shown in Table 12 below.

TABLE 12

Deposited product

| | |
|---|---|
| Fe composition | 70.2% by mass to 88% by mass |
| Bs | 1.9 T to 2.02 T |
| Surface roughness | 2 nm to 10 nm |
| Membrane stress | 90 MPa to 670 MPa |

Table 12 indicates that the NiFe alloy has a Fe composition ratio of 70% by mass to 88% by mass, and a saturation magnetic flux density Bs of 1.9 T or more, and 2.0 T or more in some cases according to the composition ratio. Furthermore, the average crystal grain diameter of the NiFe alloy shown in Table 12 was 130 Å or more, and the center line average roughness Ra of the film plane was 10 nm or less, appropriately suppressing surface roughness of the film plane.

Comparison between Tables 12 and 8 reveals that the Fe content shown in Table 12 is higher than that shown in Table 8. This is because the Ni ion concentration of the plating bath is further decreased to improve the agitation effect.

Table 13 shows a plating bath composition (Comparative Example 4) having a Ni ion concentration fixed at 6.68 g/l, which was about ⅙ of the Ni ion concentration shown in Table 1, and a ratio of Fe ion concentration/Ni ion concentration of 0.36 or more.

TABLE 13

Bath having Fe ion/Ni ion ratio of 0.36 or more

| | |
|---|---|
| Fe ion | 3.62, 3.82, 4.22 g/l |
| Ni ion | 6.68 g/l |
| Saccharin sodium | 2 g/l |
| Sodium lauryl sulfate | 0.02 g/l |
| Boric acid | 25 g/l |
| Sodium chloride | 25 g/l |

The soft magnetic properties and film properties of the NiFe alloy film formed from the plating bath composition shown in Table 13 are shown in Table 14 below.

TABLE 14

Deposited product

| | |
|---|---|
| Fe composition | 74% by mass to 82% by mass |
| Bs | 1.9 T to 2 T |
| Surface roughness | 10 nm or more |
| Membrane stress | 270 MPa or more |

Table 14 indicates that the NiFe alloy has a Fe composition ratio of 74% by mass to 82% by mass, and a saturation magnetic flux density Bs of 1.9 T or more. However, the center line average roughness Ra of the film plane is 10 nm or more, deteriorating the surface roughness of the film plane, and the saturation magnetic flux density Bs does not exceed 2.0 T, unlike in Table 12.

Comparison between Tables 12 and 14 reveals that the soft magnetic properties and film properties shown in Table 12 are more desirable than those shown in Table 14.

In the present invention, according to the above experimental results, the plating bath composition is defined as follows:

The Ni ion concentration of the plating bath is 6.6 g/l to 20 g/l. The ratio of Fe ion concentration/Ni ion concentration is 0.15 to 0.36. Plating bath compositions satisfying these conditions include the plating bath composition (Example 1) shown in Table 3, the plating bath composition (Example 2) shown in Table 7, and the plating bath composition (Example 3) shown in Table 11.

Tables 4, 8 and 12 indicate that with the NiFe alloys obtained from the corresponding plating bath compositions, the Fe composition ratio is 70% by mass to 90% by mass, and the saturation magnetic flux density Bs is 1.9 T or more. Also, the average crystal grain diameter can be controlled to 130 Å to 150 Å, and the center line average roughness of the film plane, and the membrane stress can be set in appropriate ranges.

For example, with the plating bath composition shown in Table 7, in order to set the Fe composition ratio to 76% by mass or more, the Fe ion concentration is set to 3.01 g/l or more to easily obtain the NiFe alloy having a Fe composition ratio of 76% by mass or more. With the plating bath shown in Table 11, even when the Fe ion concentration is 1.61 g/l, the Fe composition ratio can be set to 76% by mass or more in some cases. However, it was found from experiment that the Fe composition ratio can securely be set to 76% by mass or more by setting the Fe ion concentration to 1.81 g/l or more.

In the present invention, by using the above-described plating bath, a NiFe alloy film can be formed by plating with high reproducibility.

When the Ni ion concentration of the plating bath is 10 g/l or more, the ratio of Fe ion concentration/Ni ion concentration is preferably 0.2 to 0.36. Plating bath compositions satisfying these conditions include the plating bath compositions shown in Tables 3 and 7.

On the other hand, when the Ni ion concentration of the plating bath is 10 g/l or less, the ratio of Fe ion concentration/Ni ion concentration is preferably 0.15 to 0.36. A plating bath composition satisfying these conditions is the plating bath composition shown in Table 11.

In this way, when the Ni ion concentration is decreased to a low value of 10 g/l or less, the ratio of Fe ion concentration/Ni ion concentration can be set in a wider range of 0.15 to 0.36 to facilitate control of the Fe ion concentration and ratio, as compared with the case in which the Ni ion concentration is 10 g/l or more.

Next, study was conducted for examining the relations between the Fe composition ratio and soft magnetic properties and film properties of a NiFe alloy film (example) formed by the electroplating method using a pulsed current and a plating bath having a Fe ion concentration of 6.6 g/l to 20 g/l and a ratio of Fe ion concentration/Ni ion concentration of 0.15 to 0.36. At the same time, study was conducted for examining the relations between the Fe composition ratio and soft magnetic properties and film properties of a NiFe alloy film (comparative example 1) formed by the electroplating method using a pulsed current and a plating bath having a Ni ion concentration of as high as 40.07 g/l and a NiFe alloy film (comparative example 5) formed by the electroplating method using a DC current.

Description will now be made of the relation between the Fe composition and the saturation magnetic flux density of the sample of each of the example, and comparative examples 1 and 5.

Figure 8:
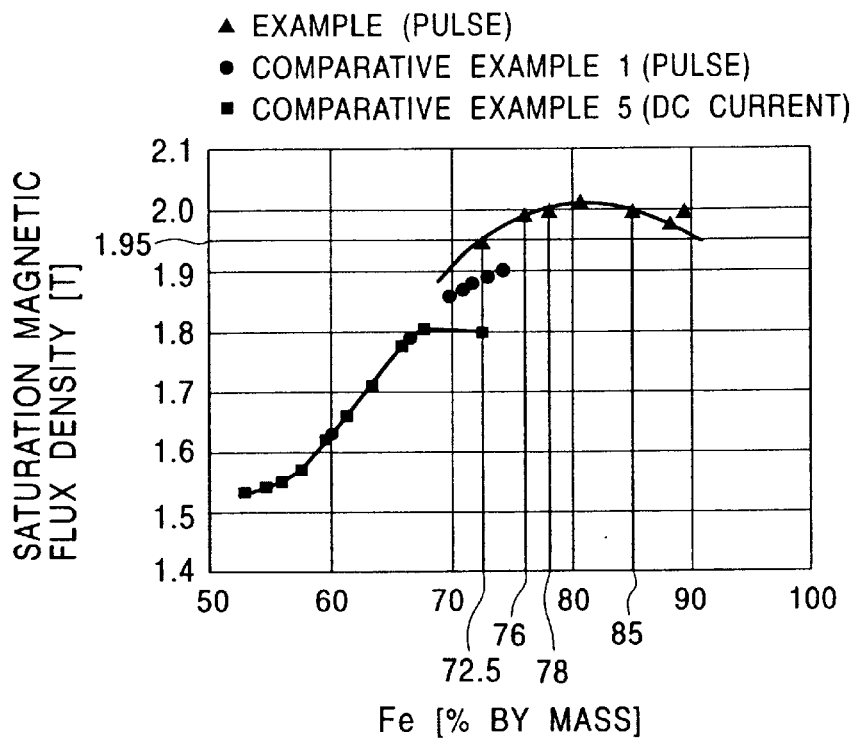
FIG. 8 is a graph showing the relation between the Fe composition ratio and saturation magnetic flux density Bs in an example in which a NiFe alloy film is formed by an electroplating method using a pulsed current, comparative example 1 in which a NiFe alloy film is formed by the same electroplating method using the pulsed current and a plating bath having a high Ni ion concentration, and comparative example 5 in which a NiFe alloy film is formed by an electroplating method using a DC current.

FIG. 8 indicates that in the example, the Fe composition ratio X can be increased, as compared with comparative examples 1 and 5.

In comparative example 5, the upper limit of the Fe composition ratio X is about 72.5% by mass, and in comparative example 1 using the same electroplating method with the pulsed current as the example, the upper limit of the Fe composition ratio X is about 75% by mass.

On the other hand, in the example, the Fe composition ratio X can be increased to 75% by mass or more. This is because the concentration of the plating bath composition of the example is lower than that of the plating bath composition of comparative example 1 to increase the agitating effect, thereby increasing the Fe content of the film.

FIG. 8 also indicates that in the example, the Fe composition ratio X is set to 76% by mass to 90% by mass, increasing the saturation magnetic flux density Bs to 1.95 T or more. The possible reason why the saturation magnetic flux density Bs decreases when the Fe composition ratio X is 90% or more is that a crystal is not finely grown to fail to densely form a crystal.

On the other hand, in comparative example 1, the saturation magnetic flux density Bs is about 1.9 T at most, and in comparative example 5, Bs is about 1.8 T at most. It is thus found that in the example, the saturation magnetic flux density Bs can be increased, as compared with comparative examples 1 and 5.

Therefore, in the present invention, in order to set the saturation magnetic flux density Bs of the NiFe alloy to 1.95 T or more, the Fe composition ratio X is 76% by mass to 90% by mass.

FIG. 8 further indicates that in the example, with the Fe composition ratio X of 70% by mass to 90% by mass, the saturation magnetic flux density Bs can be increased to 1.9 T or more. In comparative example 1, the Fe composition ratio X can be increased to about 75% by mass at most, but the saturation magnetic flux density Bs cannot be increased to 1.9 T or more. Therefore, with the Fe composition ratio X of 70% by mass to 90% by mass, the saturation magnetic flux density Bs of the example can be increased to a higher value than that of comparative example 1.

This is because in the example, the average crystal grain diameter can be increased, and a dense crystal can be formed, as compared with comparative example 1.

Figure 9:
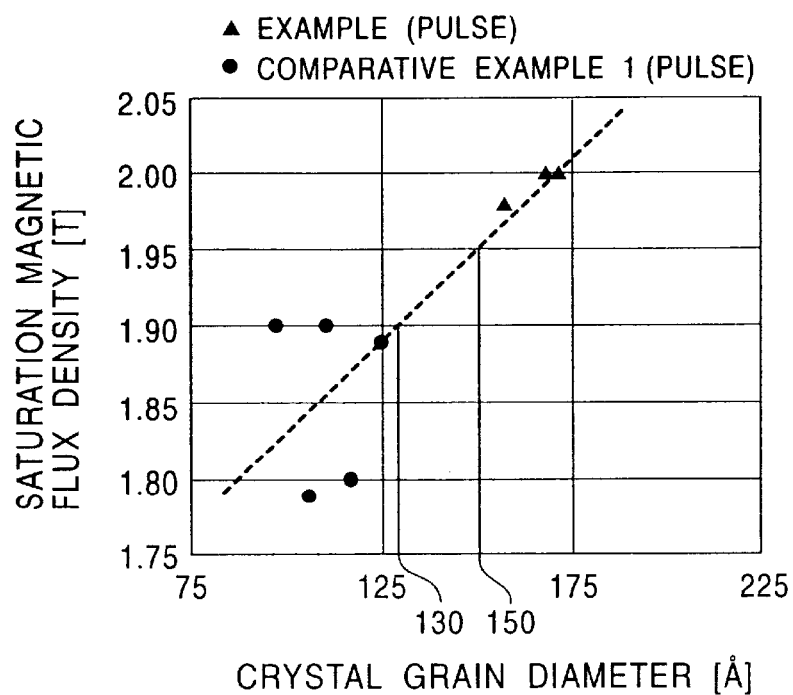
FIG. 9 is a graph showing the relation between the crystal grain diameter and saturation magnetic flux density Bs in an example and comparative example 1.

FIG. 9 is a graph showing the relation between the average crystal grain diameter and the saturation magnetic flux density Bs of the NiFe alloy of each of the example and comparative example 1. The average crystal grain diameter was measured from the half width of an X-ray diffraction profile.

FIG. 9 indicates that the saturation magnetic flux density Bs increases as the crystal grain diameter increases. The experimental results show that with the average crystal grain diameter of 130 Å or more, the saturation magnetic flux density Bs can be increased to 1.9 T or more. It is also found that with the average crystal grain diameter of 150 Å or more, the saturation magnetic flux density Bs can be increased to 1.95 T or more, and with the average crystal grain diameter of 170 Å or more, the saturation magnetic flux density Bs can be increased to 2.0 T or more.

On the other hand, in comparative example 1, the average crystal grain diameter is smaller than the example, and the saturation magnetic flux density Bs cannot be increased to 1.9 T or more.

The reason why such a difference in crystal grain diameter occurs between the example and comparative example is that the Ni ion concentration of the plating bath of the example is lower than that of comparative example 1, and thus Fe ions can be constantly supplied, thereby appropriately introducing Fe over the entire region of the film. This possibly prevents the occurrence of crystal grain boundaries, facilitating crystal growth.

In the present invention, the crystal is more densely formed as the crystal grain diameter increases, and thus the saturation magnetic flux density Bs is increased to, for example, 1.9 T or more.

It is thus found that when the Fe composition ratio of the NiFe alloy is 70% by mass to 90% by mass, and the average crystal grain diameter is 130 Å to 175 Å, the saturation magnetic flux density Bs can be increased to 1.9 T or more. It is also found that when the Fe composition ratio of the NiFe alloy is 72.5% by mass or more, and the average crystal grain diameter is 150 Å or more, the saturation magnetic flux density Bs can be increased to 1.95 T or more.

When the Fe composition ratio of the NiFe alloy is 78% by mass to 85% by mass, the saturation magnetic flux density Bs can be increased to 2.0 T or more.

In the present invention, the Fe composition ratio X of the NiFe alloy and the average crystal grain diameter were examined in relation to coercive force Hc.

Figure 10:
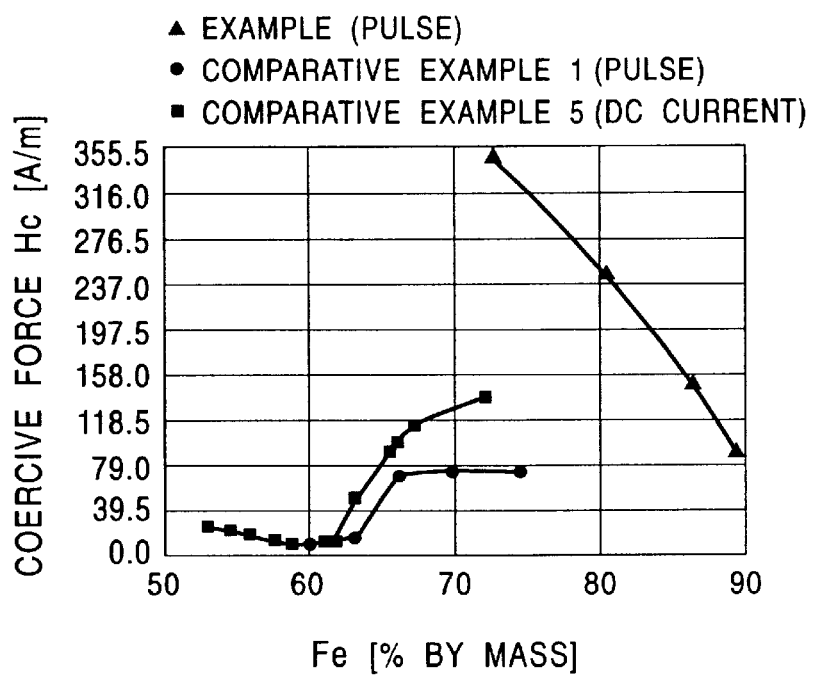
FIG. 10 is a graph showing the relation between the Fe composition ratio and coercive force Hc in an example, comparative example 1 and comparative example 5.

FIG. 10 is a graph showing the relation between the Fe composition ratio X of the NiFe alloy and coercive force Hc. This graph indicates that in the example, the coercive force Hc is 355.5 (A/m) or less, which is higher than comparative examples 1 and 5.

It is also found that in the example, the coercive force Hc decreases as the Fe composition ratio of the NiFe alloy increases. This tendency is possibly due to the fact that the average crystal grain diameter decreases as the Fe composition ratio X increases. In this way, the magnitude of coercive force Hc greatly depends upon the average crystal grain diameter. Therefore, the average crystal grain diameter of the NiFe alloy, which can be used as a core material of a thin film magnetic head and which has a coercive force Hc of 553 (A/m) or less, was examined.

Figure 11:
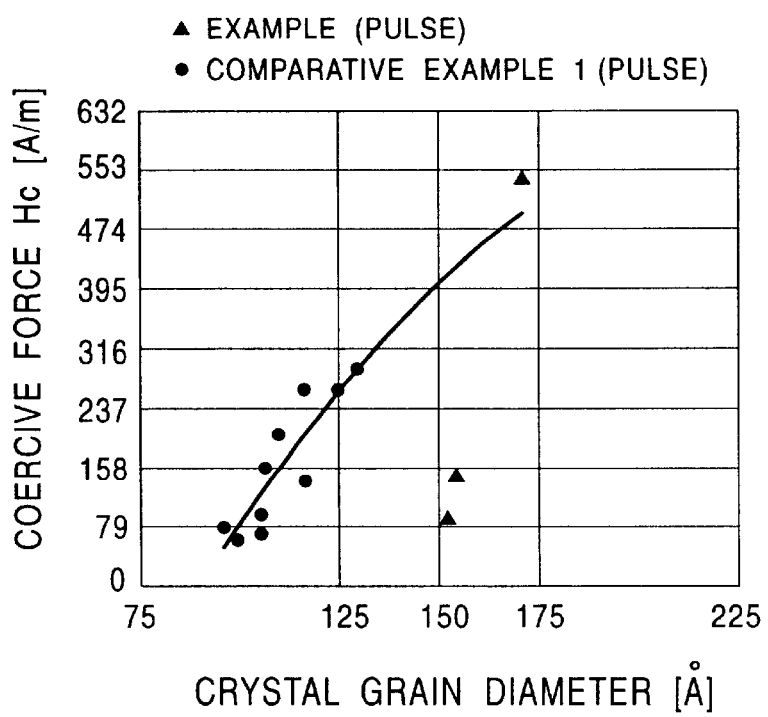
FIG. 11 is a graph showing the relation between the crystal grain diameter and coercive force Hc in an example and comparative example 1.

FIG. 11 is a graph showing the relation between the average crystal grain diameter and coercive force Hc in the example and comparative example 1.

FIG. 11 indicates that in the example, the average crystal grain diameter is larger than comparative example 1, and the coercive force Hc increases as the average crystal grain diameter increases. However, even when the crystal grain diameter of the example is larger than that of comparative example 1, the coercive force Hc increases at a low rate. This is possibly due to the fact that even when the crystal grain diameter is increased, a dense crystal is formed.

The above experimental results reveal that the average crystal grain diameter with which the coercive force Hc is 553 (A/m) or less is 175 Å.

Therefore, in the present invention, when the Fe composition ratio X of the NiFe alloy is 70% by mass to 90% by mass, the average crystal grain diameter is set to 130 Å to 175 Å. Consequently, the saturation magnetic flux density Bs can be increased to 1.9 T or more, and the coercive force Hc can be decreased to 553 (A/m) or less.

Next, the relation between the Fe composition ratio X and resistivity of the NiFe alloy in each of the example and comparative examples 1 and 5 was examined. The resistivity is an important soft magnetic property for decreasing an eddy current loss accompanying increases in frequency and recording density in future. The experimental results are shown in FIG. 12.

Figure 12:
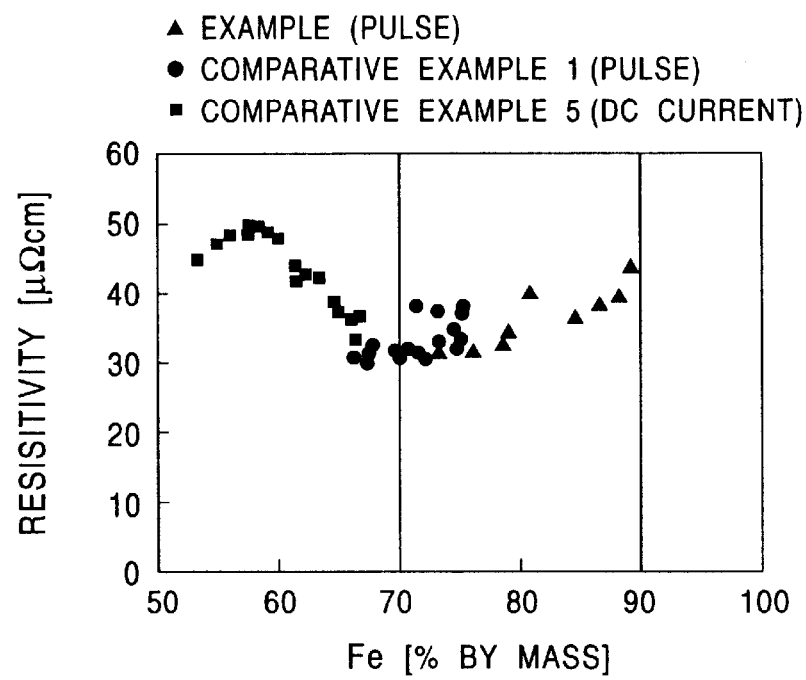
FIG. 12 is a graph showing the relation between the Fe composition ratio and resistivity in an example, comparative example 1 and comparative example 5.

FIG. 12 indicates that in the NiFe alloy of the example having a Fe composition ratio in the range of 70% by mass to 90% by mass, resistivity is in the range of 30 ($\mu\Omega$·cm) to 50 ($\mu\Omega$·cm). On the other hand, in the NiFe alloys of comparative examples 1 and 5 each having a Fe composition ratio X lower than that of the example, resistivity is in the range of 30 ($\mu\Omega$·cm) to 50 ($\mu\Omega$·cm).

Namely, in the example, the same level of resistivity as comparative examples 1 and 5 can be obtained.

Next, in the present invention, the relation between the Fe composition ratio X and membrane stress of each of the samples of the examples and comparative examples 1 and 5 was examined. The membrane stress is preferably as low as possible in order to prevent peeling and cracking of a film after plating of the NiFe alloy. The experimental results are shown in FIG. 13.

Figure 13:
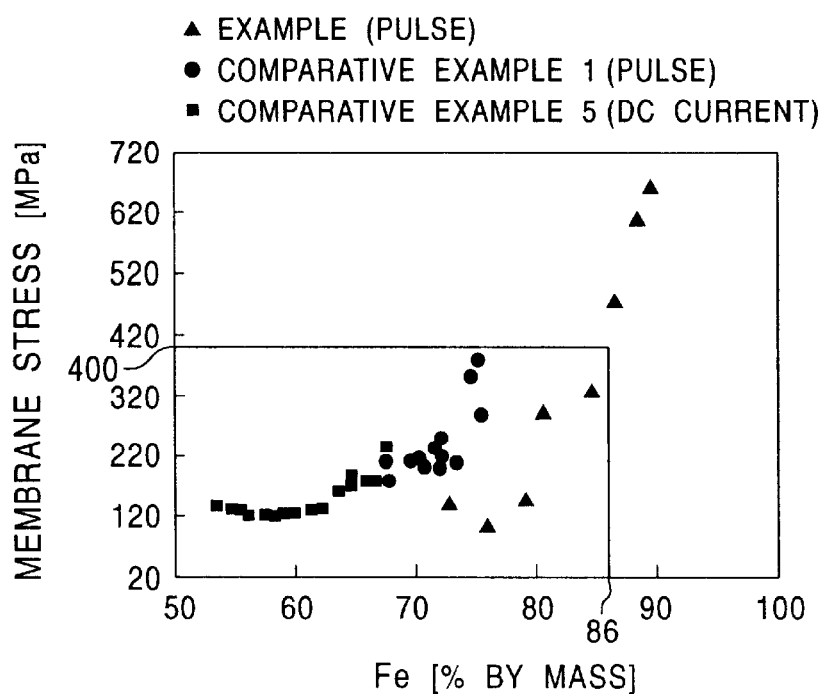
FIG. 13 is a graph showing the relation between the Fe composition ratio and membrane stress in an example, comparative example 1 and comparative example 5.

FIG. 13 indicates that in each of the example and comparative examples 1 and 5, the membrane stress increases as the Fe composition ratio X increases.

However, it is found that in the example, the membrane stress is low even when the Fe composition ratio X is in a higher range than comparative examples 1 and 5, and the membrane stress is 400 MPa or more when the Fe composition ratio X is 86% by mass or more. Therefore, in the present invention, the Fe composition ratio X is preferably in the range of 86% by mass or less, thereby decreasing the membrane stress to 400 MPa or less.

Next, in the present invention, the range of the center line average roughness Ra of the film plane of a NiFe alloy film is defined. In order to improve corrosion resistance, the center line average roughness Ra is as low as possible. Particularly, the center line average roughness Ra greatly influences the coercive force Hc, and the coercive force Hc decreases as the Ra decreases.

Therefore, the relation between the center ling average roughness Ra of the film plane and coercive force Hc of each of the samples of the example and comparative example 1 was examined. The experimental results are shown in FIG. 14.

Figure 14:
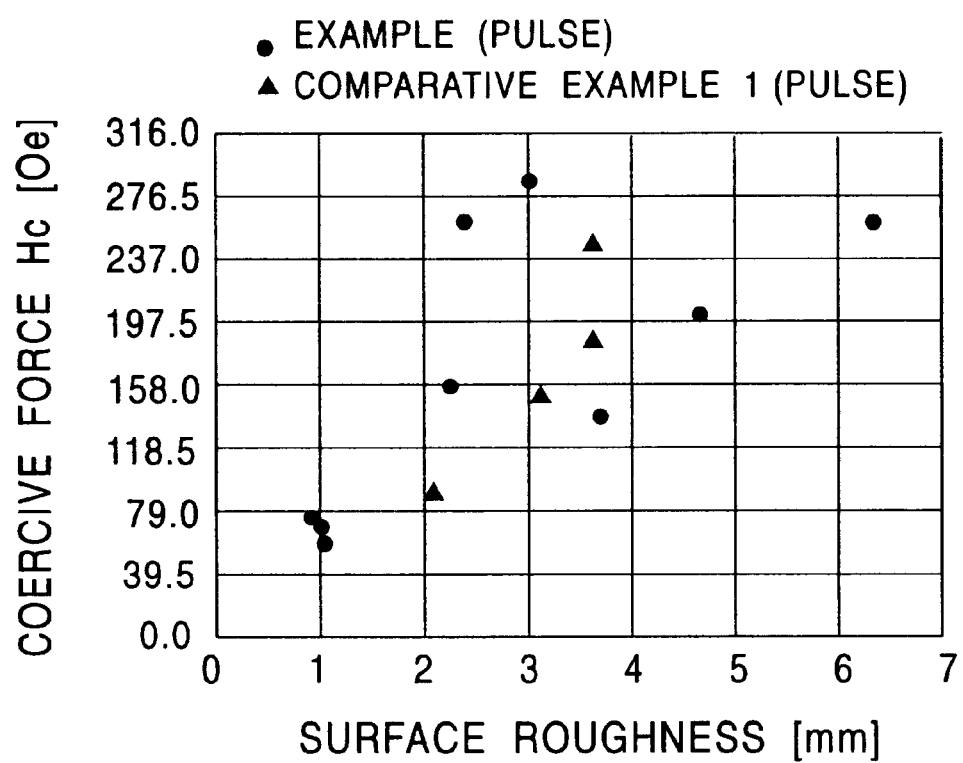
FIG. 14 is a graph showing the relation between the center line average roughness Ra of a film plane and coercive force Hc in an example and comparative example 1.

FIG. 14 indicates that coercive force Hc readily increases as the center line average roughness Ra of the film plane increases. In the present invention, the center line average roughness Ra is preferably 10 nm or less, and more preferably 7 nm or less. FIG. 14 also indicates that with a center line average roughness Ra of 7 nm or less, coercive force Hc can be decreased to 316 (A/m) or less.

As described above, in the present invention, when the Fe composition ratio X of a soft magnetic film represented by the formula $Ni_{1-X}Fe_X$ is set to 76% by mass to 90% by mass, the saturation magnetic flux density Bs of the soft magnetic film can be increased to 1.95 T or more.

Also, when the average crystal grain diameter of a soft magnetic film represented by the formula $Ni_{1-X}Fe_X$ is set 130 Å to 175 Å, and the Fe composition ratio X is set to 70% by mass to 90% by mass, the saturation magnetic flux density Bs of the soft magnetic film can be increased to 1.90 T or more.

In the present invention, the soft magnetic film can be formed with high reproducibility by the electroplating method using a pulsed current and an appropriately controlled plating bath composition.

By using a NiFe alloy film having a saturation magnetic flux density Bs of as high as 1.9 T or more for a core layer and a pole layer of a thin film magnetic film, a thin film magnetic head adaptable to a higher recording density and higher frequency in future can be manufactured.

In the present invention, when a core layer and a pole layer of a thin film magnetic head comprises a $Ni_{1-X}Fe_X$ alloy in which the Fe composition ratio X is 76% by mass to 90% by mass, the saturation magnetic flux density Bs of the NiFe alloy can be increased to 1.95 T or more.

Also, when the average crystal grain diameter of a soft magnetic film represented by the formula $Ni_{1-X}Fe_X$ is set 130 Å to 175 Å, and the Fe composition ratio is set to 70% by mass to 90% by mass, the saturation magnetic flux density Bs can be increased to 1.90 T or more.

In the present invention, the soft magnetic film can be formed with high reproducibility by the electroplating method using a pulsed current and an appropriately controlled plating bath composition.

By using a NiFe alloy film having a saturation magnetic flux density Bs of as high as 1.9 T or more for a core layer and a pole layer of a thin film magnetic film, a thin film magnetic head adaptable to a higher recording density and higher frequency in future can be manufactured.

What is claimed is:

1. A soft magnetic film having a composition represented by the formula $Ni_{1-X}Fe_X$ wherein the Fe composition ratio X is 76% by mass to 90% by mass, wherein an average crystal grain diameter is 150 Å to 175 Å.

2. A soft magnetic film according to claim 1, wherein the saturation magnetic flux density Bs is 1.95 T or more.

3. A soft magnetic film according to claim 1, wherein coercive force Hc is 553 (A/m) or less.

4. A soft magnetic film according to claim 1, wherein the center line average roughness Ra of a film plane is 10 nm or less.

5. A soft magnetic film according to claim 4, wherein the center line average roughness Ra of a film plane is 7 nm or less.

6. A soft magnetic film according to claim 1, wherein the soft magnetic film is formed by plating.

7. A soft magnetic film having a composition represented by the formula $Ni_{1-X}Fe_X$ wherein the average crystal grain diameter is 130 Å to 175 Å, and the Fe composition ratio X is in the range of 70% by mass to 90% by mass.

8. A soft magnetic film according to claim 7, wherein the Fe composition ratio X is 72.5% by mass or more.

9. A soft magnetic film according to claim 8, wherein the average crystal grain diameter is 150 Å or more.

10. A soft magnetic film according to claim 7, wherein the Fe composition ratio X is 78% by mass to 85% by mass.

11. A soft magnetic film according to claim 10, wherein the saturation magnetic flux density Bs is 2.0 T or more.

12. A soft magnetic film according to claim 7, wherein the saturation magnetic flux density Bs is 1.9 T or more.

13. A thin film magnetic head comprising a lower core layer made of a magnetic material, an upper core layer formed on the lower core layer with a magnetic gap provided therebetween, and a coil layer for supplying a recording magnetic field to both core layers;

wherein at least one of the core layers comprises a soft magnetic film represented by the composition formula $Ni_{1-X}Fe_X$, and having a Fe composition ratio X of 76% by mass to 90% by mass, and wherein the soft magnetic film has an average crystal grain diameter of 150 Å to 175 Å.

14. A thin film magnetic head according to claim 13, further comprising a lower pole layer formed to protrude above the lower core layer at a surface facing a recording medium, wherein the lower pole layer comprises the soft magnetic film.

15. A thin film magnetic head according to claim 13, wherein the Fe composition ratio X is 78% by mass to 85% by mass.

16. A thin film magnetic head according to claim 13, wherein the soft magnetic film is formed by plating.

17. A thin film magnetic head comprising a lower core layer, an upper core layer, and a pole portion located between the lower core layer and the upper core layer and having a width dimension in the track width direction, which is defined to be shorter than the lower core layer and the upper core layer;

wherein the pole portion comprises a lower pole layer continued from the lower core layer, an upper pole layer continued from the upper core layer, and a gap layer positioned between the lower pole layer and the upper pole layer, or an upper pole layer continued from the upper core layer and a gap layer positioned between the upper pole layer and the lower core layer;

wherein the upper pole layer and/or the lower pole layer comprises a soft magnetic film represented by the composition formula $Ni_{1-X}Fe_X$, and having a Fe composition ratio X of 76% by mass to 90% by mass, and wherein the soft magnetic film has an average crystal grain diameter of 150 Å to 175 Å.

18. A thin film magnetic head according to claim 17, wherein the upper pole layer comprises the soft magnetic film, and the upper core layer formed on the upper pole layer comprises a soft magnetic film having a lower saturation magnetic flux density Bs than the upper pole layer.

19. A thin film magnetic head according to claim 17, wherein each of the core layers comprises at least a portion in contact with the magnetic gap, which comprises at least two magnetic layers, or each of the pole layers comprises at least two magnetic layers, the magnetic layer in contact with the magnetic gap comprising the soft magnetic film.

20. A thin film magnetic head according to claim 19, wherein the magnetic layer other than the magnetic layer in contact with the magnetic gap comprises a soft magnetic film having a lower saturation magnetic flux density Bs than the magnetic layer in contact with the magnetic gap.

21. A thin film magnetic head comprising a lower core layer made of a magnetic material, an upper core layer formed on the lower core layer with a magnetic gap provided therebetween, and a coil layer for supplying a recording magnetic field to the upper and lower core layers, wherein at least one of the upper and lower core layers comprises a soft magnetic film represented by the composition formula $Ni_{1-X}Fe_X$ and having an average crystal grain diameter of 130 Å to 175 Å and a Fe composition ratio X of 70% by mass to 90% by mass.

22. A thin film magnetic head according to claim 21, wherein the Fe composition ratio X is 72.5% by mass or more.

23. A thin film magnetic head according to claim 22, wherein the average crystal grain diameter is 150 Å or more.

* * * * *